United States Patent
Ota et al.

(10) Patent No.: US 10,121,596 B2
(45) Date of Patent: Nov. 6, 2018

(54) MULTILAYER CERAMIC CAPACITOR

(71) Applicant: Murata Manufacturing Co., Ltd., Nagaokakyo-shi, Kyoto-fu (JP)

(72) Inventors: Yutaka Ota, Nagaokakyo (JP); Satoshi Kodama, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 21 days.

(21) Appl. No.: 15/368,717

(22) Filed: Dec. 5, 2016

(65) Prior Publication Data

US 2017/0169954 A1    Jun. 15, 2017

(30) Foreign Application Priority Data

Dec. 11, 2015   (JP) .................. 2015-242109

(51) Int. Cl.
| | |
|---|---|
| *H01G 4/33* | (2006.01) |
| *H01G 4/012* | (2006.01) |
| *H01G 4/232* | (2006.01) |
| *H01G 4/30* | (2006.01) |
| *H01G 4/12* | (2006.01) |

(52) U.S. Cl.
CPC ............ *H01G 4/33* (2013.01); *H01G 4/012* (2013.01); *H01G 4/232* (2013.01); *H01G 4/30* (2013.01); *H01G 4/12* (2013.01)

(58) Field of Classification Search
CPC .......... H01G 4/33; H01G 4/012; H01G 4/232; H01G 4/30; H01G 4/12
USPC ...................................................... 361/301.4
See application file for complete search history.

(56) References Cited

U.S. PATENT DOCUMENTS

| | | | |
|---|---|---|---|
| 2012/0194963 A1 | 8/2012 | Kuroda et al. | |
| 2013/0088319 A1* | 4/2013 | Saito .................. | H01C 1/1413 338/25 |
| 2015/0131195 A1* | 5/2015 | Park ..................... | H01G 2/14 361/275.3 |

(Continued)

FOREIGN PATENT DOCUMENTS

| | | |
|---|---|---|
| JP | 10-289837 A | 10/1998 |
| JP | 11-162773 A | 6/1999 |

(Continued)

OTHER PUBLICATIONS

Official Communication issued in Korean Patent Application No. 10-2016-0164803, dated Jun. 18, 2018.

*Primary Examiner* — Michael P McFadden
(74) *Attorney, Agent, or Firm* — Keating & Bennett, LLP

(57) ABSTRACT

A multilayer ceramic capacitor includes a laminated body including multiple ceramic layers. On the ceramic layers, first internal electrodes and second internal electrodes are arranged spaced away from each other, and exposed at a second principal surface of the laminated body. On the ceramic layers which are different from the ceramic layers on which the first internal electrodes are disposed, first auxiliary conductors, second auxiliary conductors, and third auxiliary conductors are disposed, and the second auxiliary conductors and the third auxiliary conductors are exposed from the first principal surface. A first external electrode connected to the first internal electrodes and the second auxiliary conductors and a second external electrode connected to the second internal electrodes and the third auxiliary conductors are disposed on the second principal surface.

20 Claims, 10 Drawing Sheets

(56) References Cited

U.S. PATENT DOCUMENTS

2015/0287549 A1\* 10/2015 Park ................ H01G 2/065
                                                                361/270
2015/0348711 A1   12/2015 Kim et al.
2016/0111216 A1\*  4/2016 Lee ................. H01G 4/30
                                                                361/301.4

FOREIGN PATENT DOCUMENTS

| JP | 2012-156471 A | 8/2012 |
| KR | 2003-282356 A | 10/2003 |
| KR | 10-2015-0136819 A | 12/2015 |

\* cited by examiner

Prior Art            1

MULTILAYER CERAMIC CAPACITOR

CROSS REFERENCE TO RELATED APPLICATIONS

This application claims the benefit of priority to Japanese Patent Application No. 2015-242109 filed on Dec. 11, 2015. The entire contents of this application are hereby incorporated herein by reference.

BACKGROUND OF THE INVENTION

1. Field of the Invention
This invention relates to a multilayer ceramic capacitor.
2. Description of the Related Art
In recent years, the reduction in size for mobile electronic devices has been advanced. Mobile electronic devices have a large number of multilayer ceramic electronic components mounted, and with the reduction in size for the mobile electronic devices, the reduction in size has been also required for the multilayer ceramic electronic components. Furthermore, for multilayer ceramic electronic components with external electrodes formed on both end surfaces of laminated bodies including internal electrodes, there is a need to form, in order to mount the components on wiring patterns of circuit boards, solder fillets that spread like foundations of mountains between the external electrodes and the wiring patterns. Therefore, there is a need to form the wiring patterns of the circuit boards to undergo an increase in size by the solder fillets from the end surfaces of the multilayer ceramic electronic components, and the spaces for mounting the multilayer ceramic electronic component will, thus, be increased. However, with the reduction in size for the mobile electronic devices, in addition to the reduction in size for the multilayer ceramic electronic components, it is also required that the mounting intervals between components mounted on the circuit boards should be reduced to reduce the mounting spaces.

Now, there is, as a multilayer ceramic electronic component, for example, a multilayer ceramic capacitor 1 that has internal electrodes 2 formed to be perpendicular to mounting surface for a circuit board, with the internal electrodes 2 extended to external electrodes 3 formed on the mounting surface, as shown in FIG. 14. This multilayer ceramic capacitor 1, which is able to be mounted on a wiring pattern of the circuit board with the external electrodes 3 formed on one mounting surface, requires no solder fillets that spread externally from ends of the multilayer ceramic capacitor, thereby making it possible to reduce the space for mounting the multilayer ceramic capacitor 1 (see Japanese Patent Application Laid-Open No. 10-289837).

In this regard, recent multilayer ceramic capacitors have been used in more severe environments as compared with conventional capacitors, and thus, for example, with shocks caused by falls of mobile devices, such as cellular phones and portable music players, and as for capacitors used in in-car devices, such as ECUs, multilayer ceramic capacitors may be cracked with external electrode ends or the like of the multilayer ceramic capacitors as starting points by deflection stress generated through thermal expansion and contraction of mounting boards in response to thermal cycles.

However, in the case of the internal electrode pattern (that is, the internal electrode pattern such as first internal electrodes and second internal electrodes opposed) of the multilayer ceramic capacitor disclosed in Japanese Patent Application Laid-Open No. 10-289837 as shown in FIG. 14, when the multilayer ceramic capacitor is cracked as described above, short circuits may be caused between the internal electrodes with different polarities, thereby causing short circuit defects.

SUMMARY OF THE INVENTION

Preferred embodiments of the invention provide a multilayer ceramic capacitor which significantly reduces or prevents the generation of short-circuit defects, even when the multilayer ceramic capacitor is cracked.

A multilayer ceramic capacitor according to a preferred embodiment of the invention includes a laminated body that includes a plurality of ceramic layers laminated, first and second principal surfaces which are opposed to each other, first and second side surfaces which are opposed to each other in the laminating direction, and first and second end surfaces which are opposed to each other, with one of the first and second principal surfaces defining a mounting surface; a first internal electrode disposed on the surface of the ceramic layer in the laminated body, and partially exposed at one of the first and second principal surfaces; a second internal electrode disposed on the surface of a same ceramic layer as the ceramic layer on which the first internal electrode is disposed, arranged spaced away from the first internal electrode, and partially exposed at one of the first and second principal surfaces; a first auxiliary conductor disposed in the laminated body, disposed on a surface of a different ceramic layer from the ceramic layer on which the first and second internal electrodes are disposed, and unexposed at any of the surfaces of the laminated body; a second auxiliary conductor disposed on the surface of the same ceramic layer as the ceramic layer on which the first auxiliary conductor is disposed, arranged spaced away from the first auxiliary conductor, and exposed at one of the first and second principal surfaces; a third auxiliary conductor disposed on the surface of the same ceramic layer as the ceramic layer on which the first and second auxiliary conductors are disposed, arranged spaced away from the first and second auxiliary conductors, and exposed at one of the first and second principal surfaces; a first external electrode connected to the first internal electrode and the second auxiliary conductor, and disposed on the first or second principal surface; and a second external electrode connected to the second internal electrode and the third auxiliary conductor, and disposed on the first or second principal surface.

In addition, in the multilayer ceramic capacitor according to a preferred embodiment of the invention, preferably, the first internal electrode is further exposed partially at the first end surface, the second internal electrode is further exposed partially at the second end surface, the second auxiliary conductor is further exposed partially at the first end surface, the third auxiliary conductor is further exposed partially at the second end surface, the first external electrode is connected to the first internal electrode and the second auxiliary conductor, and disposed partially on the first or second principal surface to the first end surface, and the second external electrode is connected to the second internal electrode and the third auxiliary conductor, and disposed partially on the first or second principal surface to the second end surface.

In addition, in the multilayer ceramic capacitor according to a preferred embodiment of the invention, the first and second internal electrodes preferably have an L-shaped, and the first auxiliary conductor, the second auxiliary conductor, and the third auxiliary conductor preferably have a rectangular or substantially rectangular shape.

Furthermore, a multilayer ceramic capacitor according to a preferred embodiment of the invention includes a laminated body that includes a plurality of ceramic layers that are laminated, first and second principal surfaces which are opposed to each other, first and second side surfaces which are opposed to each other in the laminating direction, and first and second end surfaces which are opposed to each other, with one of the first or second principal surface defining a mounting surface; a first internal electrode disposed on a surface of a ceramic layer in the laminated body, and partially exposed at the first and second principal surfaces; a second internal electrode disposed on the surface of the same ceramic layer as the ceramic layer on which the first internal electrode is disposed, arranged spaced away from the first internal electrode, and partially extended at the first and second principal surfaces; a first auxiliary conductor disposed in the laminated body, disposed on a surface of a different ceramic layer from the ceramic layer on which the first and second internal electrodes are disposed, and unexposed at any of the surfaces of the laminated body; a second auxiliary conductor disposed on the surface of the same ceramic layer as the ceramic layer on which the first auxiliary conductor is disposed, arranged spaced away from the first auxiliary conductor, and exposed at one of the first and second principal surfaces; a third auxiliary conductor disposed on the surface of the same ceramic layer as the ceramic layer on which the first and second auxiliary conductors is disposed, arranged spaced away from the first and second auxiliary conductors, and exposed at any one of the first and second principal surfaces; a fourth auxiliary conductor disposed on the surface of the same ceramic layer as the ceramic layer on which the first, second, and third auxiliary conductors are disposed, arranged spaced away from the first, second, and third auxiliary conductors, and exposed at the principal surface opposed to the surface on which the second auxiliary conductor is disposed; a fifth auxiliary conductor disposed on the surface of the same ceramic layer as the ceramic layer on which the first, second, third, and fourth auxiliary conductors are disposed, arranged spaced away from the first, second, third, and fourth auxiliary conductors, and exposed at the principal surface opposed to the surface with the third auxiliary conductor disposed; a first external electrode disposed on the second principal surface and connected to the first internal electrode and the second auxiliary conductor; a second external electrode disposed on the second principal surface and connected to the second internal electrode and the third auxiliary conductor; a third external electrode disposed on the first principal surface and connected to the first internal electrode and the fourth auxiliary conductor; and a fourth external electrode disposed on the first principal surface and connected to the second internal electrode and the fifth auxiliary conductor.

In addition, in the multilayer ceramic capacitor according to a preferred embodiment of the invention, preferably, the first internal electrode is further exposed partially at the first end surface, the second internal electrode is further exposed partially at the second end surface, the second auxiliary conductor and the fourth auxiliary conductor are further exposed partially at the first end surface, the third auxiliary conductor and the fifth auxiliary conductor are further exposed partially at the second end surface, the first external electrode is connected to the first internal electrode and the second auxiliary conductor, and disposed partially on the second principal surface to the first end surface, the second external electrode is connected to the second internal electrode and the third auxiliary conductor, and disposed partially on the second principal surface to the second end surface, the third external electrode is connected to the first internal electrode and the fourth auxiliary conductor, and disposed partially on the first principal surface to the first end surface, and the fourth external electrode is connected to the second internal electrode and the fifth auxiliary conductor, and disposed partially on the first principal surface to the second end surface.

In addition, in the multilayer ceramic capacitor according to a preferred embodiment of the invention, the first and second internal electrodes preferably have a T-shape, and the first auxiliary conductor, the second auxiliary conductor, the third auxiliary conductor, the fourth auxiliary conductor, and the fifth auxiliary conductor preferably have a rectangular or substantially rectangular shape.

In the example of the multilayer ceramic capacitor according to a preferred embodiment of the invention, in the laminated body, the first internal electrode and the second internal electrode provided on the same ceramic layer are arranged spaced away from each other. Thus, even when either the first internal electrode or the second internal electrode is short-circuited, the other one of first internal electrode or second internal electrode which is not short-circuited is able to maintain the capacitor function, because the first internal electrode and the second internal electrode are arranged spaced away from each other.

Therefore, even when the multilayer ceramic capacitor is cracked, a multilayer ceramic capacitor is provided which includes the function of preventing short circuit defects from occurring (so-called fail-safe function).

In addition, in a preferred embodiment of the multilayer ceramic capacitor, the ceramic layer on which the first, second, and third auxiliary conductors are disposed is adjacent to the different ceramic layer with the first and second internal electrode disposed. Thus, even if the laminated body is cracked from the first and second external electrodes or the like, it is possible to prevent the first internal electrodes or second internal electrode with a different polarity from being connected to each other. Therefore, even when the multilayer ceramic capacitor is cracked, a multilayer ceramic capacitor is provided which includes the function of preventing short circuit defects from occurring (so-called fail-safe function).

According to various preferred embodiments of the invention, a multilayer ceramic capacitor is obtained which significantly reduces or prevents the generation of short-circuit defects, even when the multilayer ceramic capacitor is cracked.

The above and other elements, features, steps, characteristics and advantages of the present invention will become more apparent from the following detailed description of the preferred embodiments with reference to the attached drawings.

DETAILED DESCRIPTION OF THE INVENTION

1. Multilayer Ceramic Capacitor

(1) First Preferred Embodiment

Figure 1:
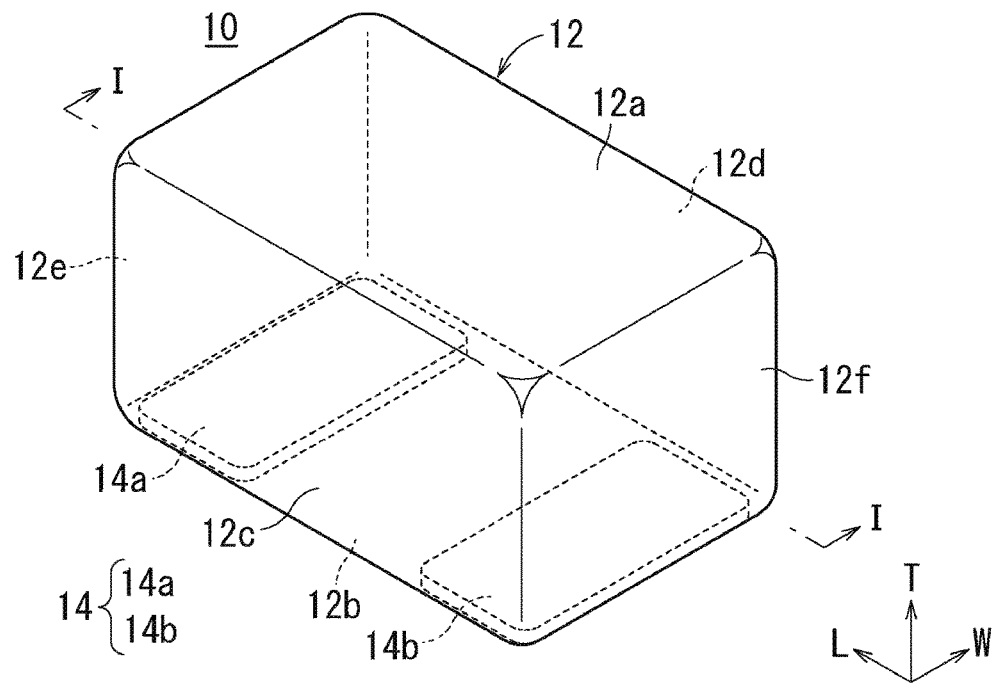
FIG. 1 is a perspective view illustrating a first preferred embodiment of a multilayer ceramic capacitor according to the present invention.

A multilayer ceramic capacitor according to a first preferred embodiment of the present invention will be described. FIG. 1 is a perspective view illustrating the first preferred embodiment of the multilayer ceramic capacitor according to the present invention, and FIG. 2 is a cross-sectional view of the multilayer ceramic capacitor shown in FIG. 1 along the line I-I.

Figure 2:
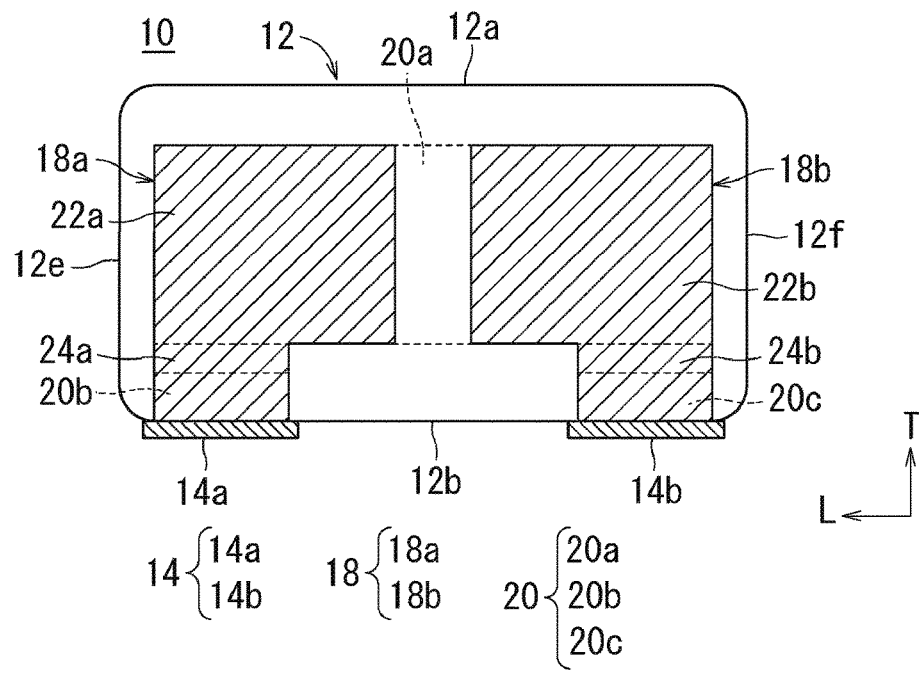
FIG. 2 is a cross-sectional view of the multilayer ceramic capacitor shown in FIG. 1 along the line I-I.
Figure 3:
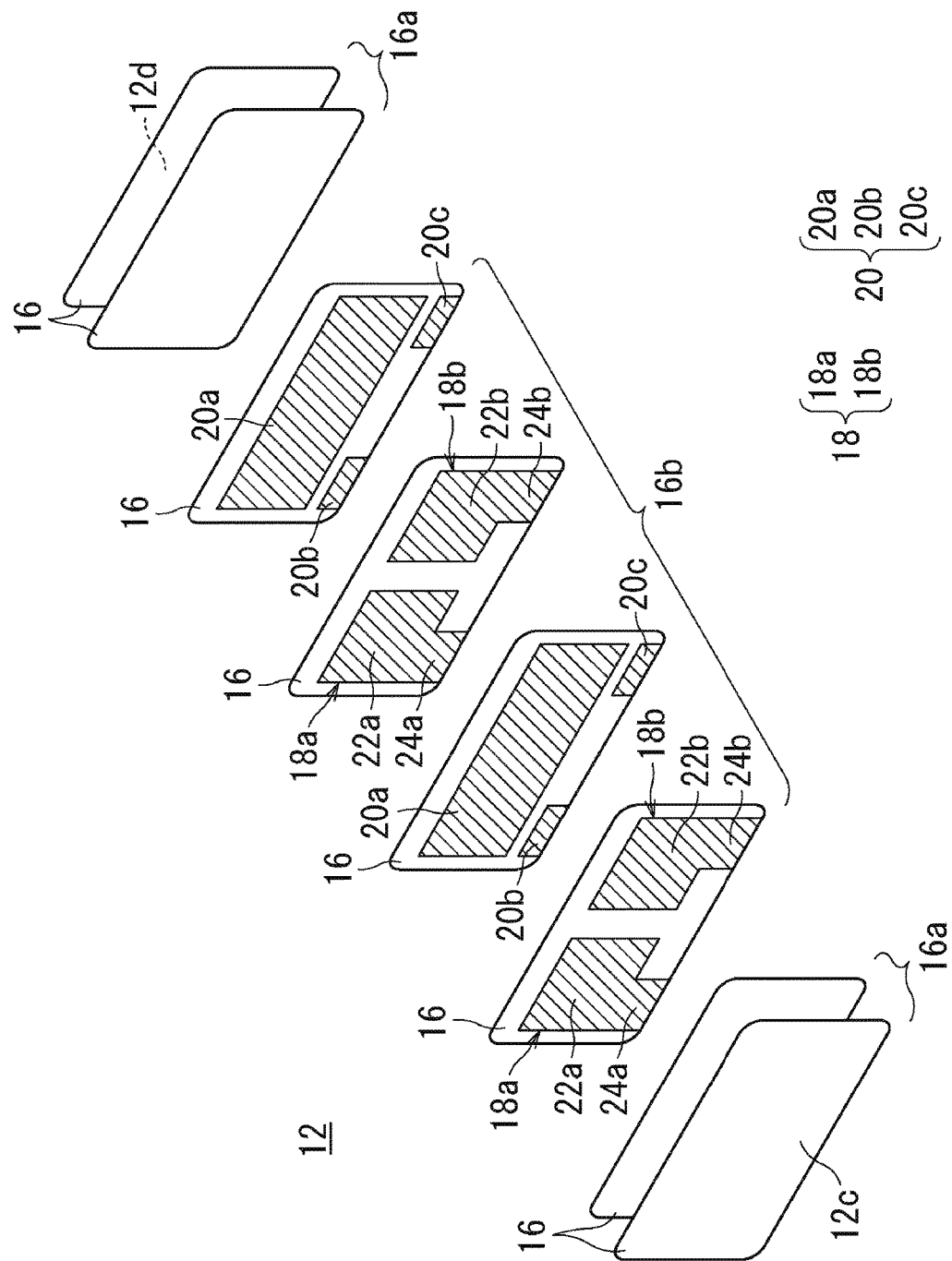
FIG. 3 is an exploded perspective view of the laminated body shown in FIGS. 1 and 2.

FIG. 3 is an exploded perspective view of the laminated body shown in FIGS. 1 and 2.

The multilayer ceramic capacitor 10 includes a laminated body 12 having a cuboid or substantially cuboid shape, and external electrodes 14.

The laminated body 12 includes multiple ceramic layers 16, multiple internal electrodes 18, and multiple auxiliary conductors 20. The laminated body 12 includes a first principal surface 12a and a second principal surface 12b opposed to each other, a first side surface 12c and a second side surface 12d opposed to the laminating direction and opposed to each other, and a first end surface 12e and a second end surface 12f opposed to each other. The first principal surface 12a and the second principal surface 12b each extend in a length direction L and a width direction W. The first side surface 12c and the second side surface 12d each extend in the length direction L and a thickness direction T. The first end surface 12e and the second end surface 12f each extend in the width direction W and the thickness direction T. The first principal surface 12a and the second principal surface 12b refer to surfaces that are parallel or substantially parallel to a surface on which the multilayer ceramic capacitor 10 is to be mounted (mounting surface). Therefore, the length direction L refers to a direction of connection of the pair of end surfaces to each other, the width direction W refers to a direction of connection of the pair of side surfaces to each other, and the thickness direction T refers to a direction of connection of the pair of principal surfaces to each other.

In addition, the laminated body 12 preferably includes rounded corners and ridges. In this regard, the corner refers to the intersection of three surfaces of the laminated body 12, and the ridge refers to the intersection of two surfaces of the laminated body 12.

The ceramic layers 16 include outer-layer portions 16a and an inner-layer portion 16b. The outer-layer portions 16a are located closer to the first side surface 12c and second side surface 12d of the laminated body 12, and include the ceramic layers 16 located between the first side surface 12c and the internal electrode 18 closest to the first side surface 12c, and the ceramic layers 16 located between the second side surface 12d and the internal electrode 18 closest to the second side surface 12d. The outer layer portion 16a is preferably about 18 μm or more and about 900 μm or less in thickness, for example. Further, the region sandwiched between both of the outer-layer portions 16a is the inner-layer portion 16b.

The ceramic layers 16 may be made of, for example, a dielectric material. As the dielectric material, a dielectric ceramic may be used which includes a constituent such as, for example, $BaTiO_3$, $CaTiO_3$, $SrTiO_3$, or $CaZrO_3$. In the example of the dielectric material as a main constituent, the dielectric material obtained with the addition of a constituent that is lower in content than the main constituent, for example, a Mn compound, a Fe compound, a Cr compound, a Co compound, a Ni compound, may be used, depending on characteristics of the multilayer ceramic capacitor 10 desired.

The fired ceramic layer 16 is preferably about 0.5 μm or more and about 10 μm or less in thickness, for example.

In the multilayer ceramic capacitor 10, the internal electrodes 18 and the auxiliary conductors 20 are laminated alternately with the ceramic layers 16 interposed therebetween in the laminated body 12, as shown in FIGS. 2 and 3.

The laminated body 12 includes, as the multiple internal electrodes 18, a plurality of first internal electrodes 18a and a plurality of second internal electrodes 18b. The first internal electrodes 18a are disposed on the surfaces of the ceramic layers 16. In addition, the first internal electrodes 18a each with a first opposed electrode portion 22a opposed to the first side surface 12c and the second side surface 12d, are laminated in the direction of connecting the first side surface 12c and the second side surface 12d.

In addition, the second internal electrodes 18b are disposed on the surfaces of the same ceramic layers 16 as the ceramic layers 16 with the first internal electrodes 18a disposed thereon. The second internal electrodes 18b each with a second opposed electrode portion 22b opposed to the first side surface 12c and the second side surface 12d, are laminated in the direction of connecting the first side surface 12c and the second side surface 12d. The first internal electrodes 18a are disposed closer to the first end surface 12e, whereas the second internal electrodes 18b are disposed closer to the second end surface 12f. In addition, the first internal electrode 18a and the second internal electrode 18b are arranged spaced away from each other on the surface of the same ceramic layer 16.

The first internal electrodes 18a include first extended electrode portions 24a that extend to the second principal surface 12b of the laminated body 12. The first extended electrode portions 24a are extended closer to the first end surface 12e of the laminated body 12. The second internal electrodes 18b include second extended electrode portions 24b that extend to the second principal surface 12b of the laminated body 12. The second extended electrode portions 24b are extended closer to the second end surface 12f of the laminated body 12, at intervals from the first extended electrode portions 24a. The first internal electrodes 18a and the second internal electrodes 18b are not exposed at the first principal surface 12a, both side surfaces 12c and 12d, and both end surfaces 12e and 12f of the laminated body 12. Further, the first internal electrodes 18a and the second internal electrodes 18b preferably have an L or substantially L shape.

It is to be noted that the first extended electrode portions 24a of the first internal electrodes 18a may be extended only to the first principal surface 12a, and in this case, the second extended electrode portions 24b of the second internal electrode 18b are extended only to the first principal surface 12a.

The first internal electrodes 18a and the second internal electrodes 18b are disposed perpendicular or substantially perpendicular to the first principal surface 12a and second principal surface 12b of the laminated body 12. The first opposed electrode portions 22a of the first internal electrodes 18a and the second opposed electrode portions 22b of the second internal electrodes 18b are disposed to be mutually opposed to the auxiliary conductors 20.

In addition, the laminated body 12 includes side portions (gaps) of the laminated body 12, which are provided between an end of the first opposed electrode portion 22a in the length direction L and the first end surface 12e, and between the other end of the second opposed electrode portion 22b in the length direction L and the second end surface 12f.

Furthermore, the laminated body 12 includes side portions (gaps) of the laminated body 12, which are provided between an end of the first internal electrode 18a on the side opposite to the first extended electrode portion 24a and the second principal surface 12b, and between an end of the second internal electrode 18b on the side opposite to the second extended electrode portion 24b and the first principal surface 12a.

The materials of the first internal electrodes 18a and second internal electrodes 18b may preferably be composed of, for example, a metal such as Ni, Cu, Ag, Pd, and Au, or an alloy containing one or more of the metals, for example, an Ag—Pd alloy. The first internal electrodes 18a and the second internal electrodes 18b may further include dielectric grains of the same or similar composition as the ceramic included in the ceramic layers 16. The first internal electrodes 18a and the second internal electrodes 18b are each preferably about 0.1 μm or more and about 2.0 μm or less in thickness, for example.

The laminated body 12 includes, as the multiple auxiliary conductors 20, a plurality of first auxiliary conductors 20a, a plurality of second auxiliary conductors 20b, and a plurality of third auxiliary conductors 20c.

The first auxiliary conductors 20a are disposed on surfaces of the ceramic layers 16 which are different from the ceramic layers 16 with the internal electrodes 18 disposed, and disposed so as not to be exposed at the surface of the laminated body 12. The shapes of the first auxiliary conductors 20a are not particularly limited, but are preferably rectangular or substantially rectangular.

The second auxiliary conductors 20b are disposed on the surfaces of the same ceramic layers 16 as the ceramic layers 16 with the first auxiliary conductors 20a disposed. The second auxiliary conductors 20b are arranged spaced away from the first auxiliary conductors 20a, and disposed so as to be exposed at the second principal surface 12b. In addition, the second auxiliary conductors 20b are disposed closer to the first end surface 12e. The shapes of the second auxiliary conductors 20b are not particularly limited, but are preferably rectangular.

The third auxiliary conductors 20c are disposed on the surfaces of the same ceramic layers 16 as the ceramic layers 16 with the first auxiliary conductors 20a and second auxiliary conductors 20b disposed. The third auxiliary conductors 20c are arranged spaced away from the first auxiliary conductors 20a and the second auxiliary conductors 20b, and disposed so as to be exposed at the second principal surface 12b. In addition, the third auxiliary conductors 20c are disposed closer to the second end surface 12f. The shapes of the third auxiliary conductors 20c are not particularly limited, but are preferably rectangular or substantially rectangular.

When the first internal electrodes 18a and the second internal electrodes 18b have L shapes, and the first auxiliary conductors 20a, the second auxiliary conductors 20b, and the third auxiliary conductors 20c have rectangular or substantially rectangular shapes, the printability of internal electrode patterns and auxiliary conductor patterns is improved in the manufacturing process, and enables easy formation of the first auxiliary conductors 20a, the second auxiliary conductors 20b, and the third auxiliary conductors 20c.

The materials of the first auxiliary conductors 20a, second auxiliary conductors 20b, and third auxiliary conductors 20c may preferably be composed of, for example, a metal such as Ni, Cu, Ag, Pd, and Au, or an alloy containing one or more of the metals, for example, an Ag—Pd alloy. The materials of the first auxiliary conductors 20a, second auxiliary conductors 20b, and third auxiliary conductors 20c may further include dielectric grains of the same or similar composition as the ceramic included in the ceramic layers 16. The materials of the first auxiliary conductors 20a, second auxiliary conductors 20b, and third auxiliary conductors 20c are each preferably about 0.1 μm or more and about 2.0 μm or less in thickness, for example.

The external electrodes 14 are provided on the second principal surface 12b of the laminated body 12. The external electrodes 14 include a first external electrode 14a structured to be electrically connected to the first extended electrode portions 24a and the second auxiliary conductors 20b; and a second external electrode 14b structured to be electrically connected to the second extended electrode portions 24b and the third auxiliary conductors 20c.

In the laminated body 12, the first opposed electrode portions 22a and the second opposed electrode portions 22b are opposed to the first auxiliary conductors 20a with the ceramic layers 16 interposed therebetween, to generate electrical characteristics (for example, electrostatic capacitance). Therefore, electrostatic capacitance is obtained between the first external electrode 14a connected to the first internal electrodes 18a and the second external electrode 14b connected to the second internal electrodes 18b. Accordingly, the multilayer ceramic capacitor 10 that includes this structure functions as a capacitor.

The external electrodes 14 preferably include a base electrode layer and a plated layer in order from the side closer to the laminated body 12. The base electrode layers each include at least one selected from a baked layer, a resin layer, a thin film layer, and the like, and a base electrode layer formed from a baked layer will be described herein.

The baked layer includes glass and a metal. The layer includes at least one metal selected from, for example, Cu, Ni, Ag, Pd, an Ag—Pd alloy, and Au, as the metal of the baked layer. The baked layer may preferably include multiple layers. The baked layer is formed by applying a conductive paste including glass and a metal to the laminated body 12, and baking the paste. The baked layer may be subjected to firing at the same time as the ceramic layers 16, the internal electrodes 18, and the auxiliary conductors 20, or may be baked after the ceramic layers 16, the internal electrodes 18, and the auxiliary conductors 20 are subjected to firing. The thickest portion of the baked layer is preferably, 10 µm or more and 50 µm or less in thickness.

A resin layer including conductive particles and a thermosetting resin may be formed on the surface of the baked layer. It is to be noted that the resin layer may be formed directly on the laminated body 12 without forming the baked layer. In addition, the resin layer may include multiple layers. The thickest portion of the resin layer is preferably about 10 µm or more and about 150 µm or less in thickness, for example.

In addition, the thin film layer is preferably a layer of about 1 µm or less, for example, formed by a thin-film formation method such as a sputtering method or a vapor deposition method, with metal particles deposited.

In addition, the plated layer preferably includes plating of one or more metals selected from Cu, Ni, Sn, Pb, Au, Ag, Pd, Bi, and Zn, or of an alloy containing one or more of the metals, for example.

The plated layer may include multiple layers. The plated layer preferably includes a two-layer structure including a first plated layer provided on the surface of the baked layer and a second plated layer provided on the surface of the first plated layer.

It is preferable to use Ni for the first plated layer. It is to be noted that when the internal electrodes 18 contain Ni, it is preferable to use, as the first plated layer, Cu which is able to be securely joined to Ni.

In addition, the second plated layer may include multiple layers, and preferably includes a two-layer structure of Ni plating and Sn plating. The Ni plating layer is used for preventing the base electrode layer from being eroded by solder used to mount the multilayer ceramic capacitor. In addition, the Sn plating layer is used to improve the wettability of the solder for mounting the multilayer ceramic capacitor, and thus allowing for easy mounting. It is to be noted that the second plated layer is formed, if necessary, and the external electrodes 14 may be composed of the plated layer provided directly on the laminated body 12 and directly connected to the internal electrodes 18, that is, the first plated layer.

However, as a pretreatment, a catalyst may be provided on the laminated body 12.

In addition, the second plated layer may be provided as an outermost layer of the plated layer, and other plated layers may be provided on the surface of the second plated layer.

The plated layer is preferably about 1 µm or more and about 10 µm or less in thickness per each layer, for example. In addition, the plated layer preferably contains no glass. Furthermore, in the plated layer, the metal proportion per unit volume is preferably about 99 volume % or more, for example. In addition, the plated layer is preferably obtained by grain growth in the thickness direction, which is columnar.

It is to be noted that the dimension of the multilayer ceramic capacitor 10 in the length direction L is referred to as an L dimension, the dimension of the multilayer ceramic capacitor 10 including the laminated body 12, the first external electrode 14a, and the second external electrode 14b in the thickness direction T is referred to as a T dimension, and the dimension of the multilayer ceramic capacitor 10 including the laminated body 12, the first external electrode 14a, and the second external electrode 14b in the width direction W is referred to as a W dimension.

While the dimensions of the laminated body 12 are not particularly limited, the L dimension in the length direction L is preferably about 0.38 mm or more and about 3.50 mm or less, the W dimension in the width direction W is preferably about 0.18 mm or more and about 2.80 mm or less, and the T dimension in the thickness direction T is preferably about 0.18 mm or more and about 2.80 mm or less, for example. Further, the dimensions of the multilayer ceramic capacitor 10 may be measured with a microscope.

In the example of the multilayer ceramic capacitor 10, in the laminated body 12, the first internal electrode 18a and the second internal electrode 18b provided on the same ceramic layer 16 are provided spaced away from each other. Thus, even when either the first internal electrode 18a or the second internal electrode 18b is short-circuited, the other internal electrode 18 which is not short-circuited is able to maintain the capacitor function, because the first internal electrode 18a is not connected to the second internal electrode 18b. Therefore, even when the multilayer ceramic capacitor 10 is cracked, a multilayer ceramic capacitor is provided which includes the function of preventing short circuit defects from occurring (so-called fail-safe function).

In addition, in this multilayer ceramic capacitor 10, the auxiliary conductors 20 are provided between the adjacent internal electrodes 18. Thus, even if the laminated body 12 is cracked from the external electrodes 14 or the like, it is possible to keep the internal electrodes 18 with a different polarity from being connected to each other. Therefore, even when the multilayer ceramic capacitor 10 is cracked, a multilayer ceramic capacitor is provided which includes the function of preventing short circuit defects from occurring (so-called fail-safe function).

Figure 4:
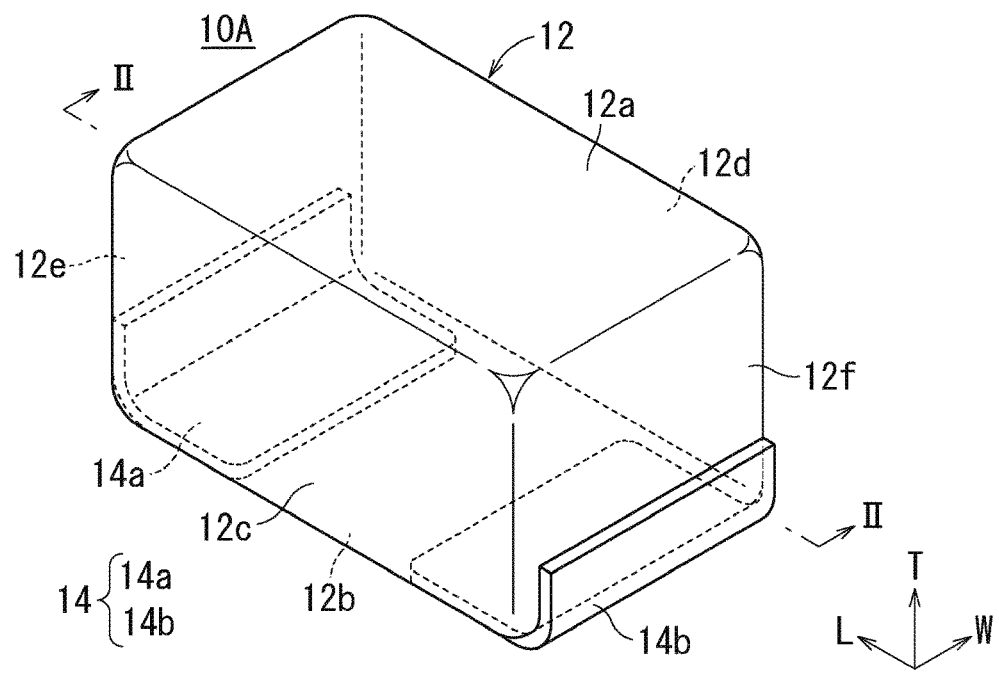
FIG. 4 is a perspective view illustrating a modified example of the first preferred embodiment of the multilayer ceramic capacitor according to the present invention.
Figure 5:
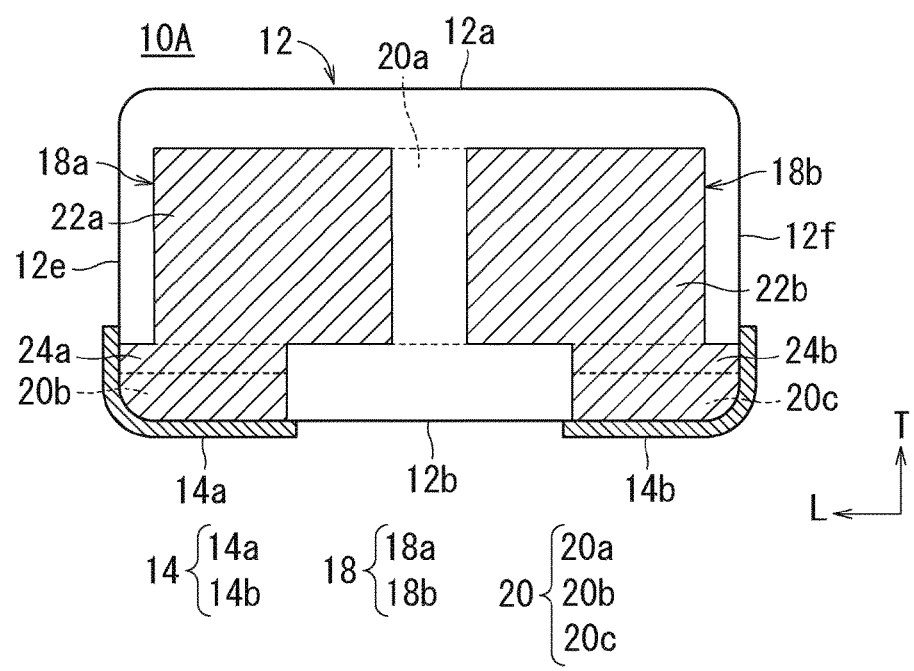
FIG. 5 is a cross-sectional view of the multilayer ceramic capacitor shown in FIG. 4 along the line II-II.
Figure 6:
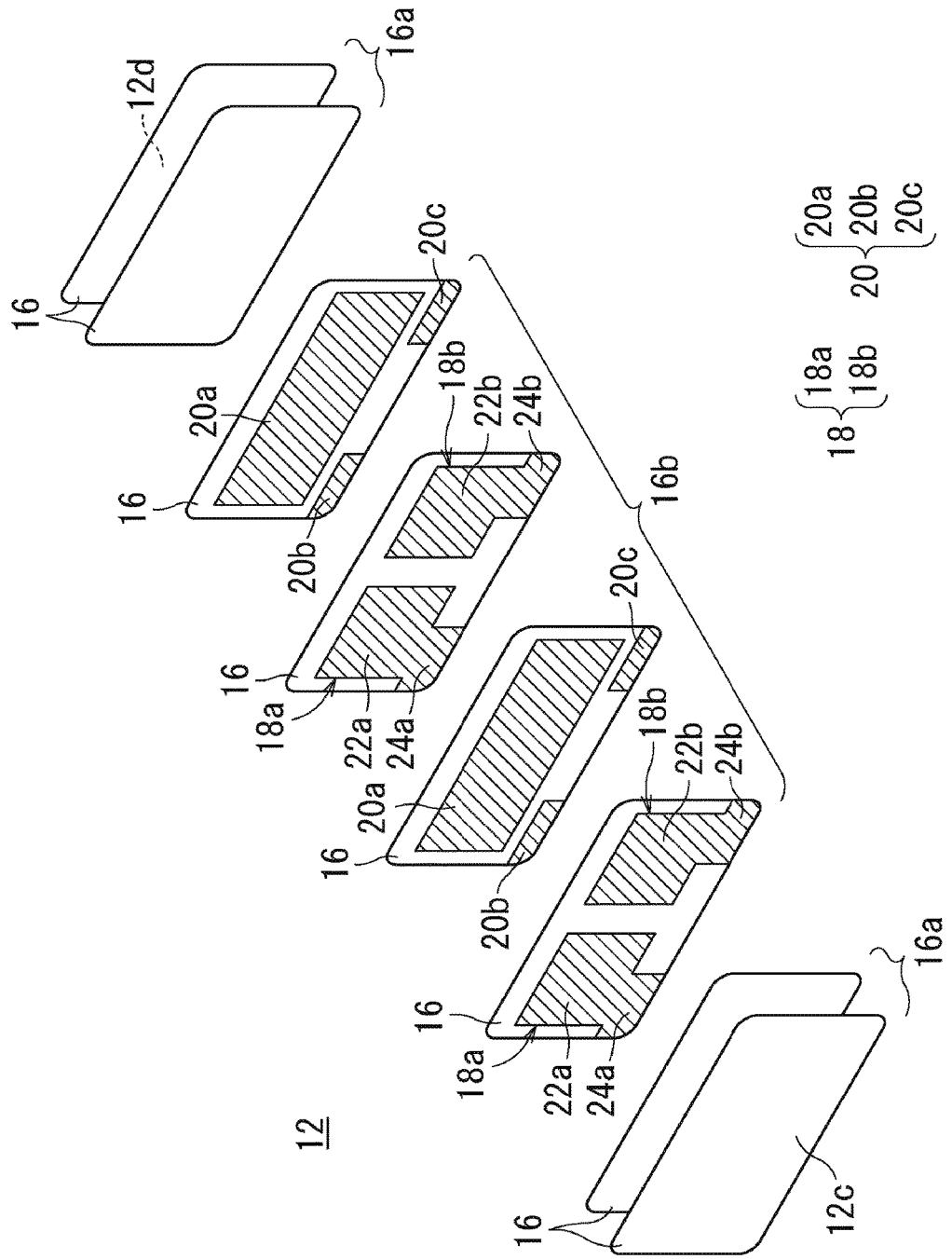
FIG. 6 is an exploded perspective view of the laminated body shown in FIGS. 4 and 5.

Next, a modified example of the multilayer ceramic capacitor according to the first preferred embodiment of the present invention will be described. FIG. 4 is an appearance perspective view illustrating a modified example of the first preferred embodiment of the multilayer ceramic capacitor according to the present invention, and FIG. 5 is a cross-sectional view of the multilayer ceramic capacitor shown in FIG. 4 along the line II-II. FIG. 6 is an exploded perspective view of the laminated body shown in FIGS. 4 and 5. It is to be noted that in the multilayer ceramic capacitor 10A shown in FIGS. 4 through 6, the same portions as those of the multilayer ceramic capacitor 10 shown in FIGS. 1 through 3 are denoted by the same symbols, and descriptions of the portions will be omitted.

The difference of the configuration of the multilayer ceramic capacitor 10A shown in FIGS. 4 through 6 from the configuration of the multilayer ceramic capacitor 10 shown in FIGS. 1 through 3 is that external electrodes 14 are also disposed on both end surfaces 12e and 12f of a laminated body 12 because internal electrodes 18 and auxiliary conductors 20 are also exposed partially at the both end surfaces 12e and 12f.

The multilayer ceramic capacitor 10A includes the laminated body 12 in the form of a cuboid, and the external electrodes 14.

The laminated body 12 includes multiple ceramic layers 16, multiple internal electrodes 18, and multiple auxiliary conductors 20.

In the multilayer ceramic capacitor 10A, the internal electrodes 18 and the auxiliary conductors 20 are laminated alternately with ceramic layers 16 interposed therebetween in the laminated body 12, as shown in FIGS. 5 and 6.

The laminated body 12 includes, as the multiple internal electrodes 18, a plurality of first internal electrodes 18a and a plurality of second internal electrodes 18b. The first internal electrodes 18a are disposed on the surfaces of the ceramic layers 16. In addition, the first internal electrodes 18a each with a first opposed electrode portion 22a opposed to the first side surface 12c and the second side surface 12d, are laminated in the direction of connecting the first side surface 12c and the second side surface 12d.

In addition, the second internal electrodes 18a are disposed on the surfaces of the same ceramic layers 16 as the ceramic layers 16 on which the first internal electrodes 18a are disposed. The second internal electrodes 18b each with a second opposed electrode portion 22b opposed to the first side surface 12c and the second side surface 12d, are laminated in the direction of connecting the first side surface 12c and the second side surface 12d. The first internal electrodes 18a are disposed closer to the first end surface 12e, whereas the second internal electrodes 18b are disposed closer to the second end surface 12f. In addition, the first internal electrode 18a and the second internal electrode 18b are arranged spaced away from each other on the surface of the same ceramic layer 16.

The first internal electrodes 18a include first extended electrode portions 24a extended to corner regions defined by the second principal surface 12b and first end surface 12e of the laminated body 12. The first extended electrode portions 24a are extended closer to the first end surface 12e. The second internal electrodes 18b include second extended electrode portions 24b that extend to corner regions defined by the second principal surface 12b and second end surface 12f of the laminated body 12. The second extended electrode portions 24b are extended closer to the second end surface 12f of the laminated body 12, at intervals from the first extended electrode portions 24a. The first internal electrodes 18a and the second internal electrodes 18b are not disposed at the first principal surface 12a and both side surfaces 12c and 12d of the laminated body 12. Further, the first internal electrodes 18a and the second internal electrodes 18b preferably have an L or substantially L shape.

The first internal electrodes 18a and the second internal electrodes 18b are disposed perpendicular or substantially perpendicular to the first principal surface 12a and second principal surface 12b of the laminated body 12. The first opposed electrode portions 22a of the first internal electrodes 18a and the second opposed electrode portions 22b of the second internal electrodes 18b are disposed to be mutually opposed to the auxiliary conductors 20.

The laminated body 12 includes, as the multiple auxiliary conductors 20, a plurality of first auxiliary conductors 20a, a plurality of second auxiliary conductors 20b, and a plurality of third auxiliary conductors 20c.

The first auxiliary conductors 20a are disposed on surfaces of the ceramic layers 16 which are different from the ceramic layers 16 on which the internal electrodes 18 are disposed, and disposed so as not to be exposed at the surface of the laminated body 12. The shapes of the first auxiliary conductors 20a are not particularly limited, but are preferably rectangular or substantially rectangular.

The second auxiliary conductors 20b are disposed on the surfaces of the same ceramic layers 16 as the ceramic layers 16 on which the first auxiliary conductors 20a are disposed. The second auxiliary conductors 20b are arranged spaced away from the first auxiliary conductors 20a, and disposed so as to be exposed partially at the second principal surface 12b and the first end surface 12e. The second auxiliary conductors 20b extend to corner regions defined by the second principal surface 12b and first end surface 12e of the laminated body 12. In addition, the second auxiliary conductors 20b are disposed closer to the first end surface 12e. The shapes of the second auxiliary conductors 20b are not particularly limited, but are preferably rectangular or substantially rectangular.

The third auxiliary conductors 20c are disposed on the surfaces of the same ceramic layers 16 as the ceramic layers 16 on which the first auxiliary conductors 20a and second auxiliary conductors 20b are disposed. The third auxiliary conductors 20c are arranged spaced away from the first auxiliary conductors 20a and the second auxiliary conductors 20b, and disposed so as to be exposed partially at the second principal surface 12b and the second end surface 12f. The third auxiliary conductors 20c extend to corner regions defined by the second principal surface 12b and second end surface 12f of the laminated body 12. In addition, the third auxiliary conductors 20c are disposed closer to the second end surface 12f. The shapes of the third auxiliary conductors 20c are not particularly limited, but preferably rectangular.

The external electrodes 14 are disposed on the second principal surface 12b of the laminated body 12. The external electrodes 14 include a first external electrode 14a and a second external electrode 14b. The first external electrode 14a is electrically connected to the first extended electrode portions 24a of the first internal electrodes 18a and the second auxiliary conductors 20b which extend to the second principal surface 12b and the first end surface 12e. Therefore, the first external electrode 14a is disposed to extend to the second principal surface 12b to the first end surface 12e.

In addition, the second external electrode 14b is electrically connected to the second extended electrode portions 24b of the second internal electrodes 18b and the third auxiliary conductors 20c which extend to the second principal surface 12b and the second end surface 12f. Therefore, the second external electrode 14b is disposed to extend to the second principal surface 12b to the second end surface 12f.

The external electrodes 14 each preferably include a base electrode layer and a plated layer in order from the side closer to the laminated body 12.

This multilayer ceramic capacitor 10A achieves the same or similar advantageous effect as that of the multilayer ceramic capacitor 10 described above, and also achieves the following advantageous effect.

More specifically, in the example of the multilayer ceramic capacitor 10A, the first external electrode 14a is disposed to extend to the second principal surface 12b to the first end surface 12e, and the second external electrode 14b is disposed to reach the second principal surface 12b to the second end surface 12f, and the electrode portions are thus disposed on the end surfaces other than the mounting surface. Therefore, the capacitor is able to not only fulfill a fail-safe function, but also prevent the multilayer ceramic capacitor from inclining in the case of mounting, and further improve the fixing strength to a mounting board, due to the increased joint surfaces of the multilayer ceramic capacitor 10A.

(2) Second Preferred Embodiment

Figure 7:
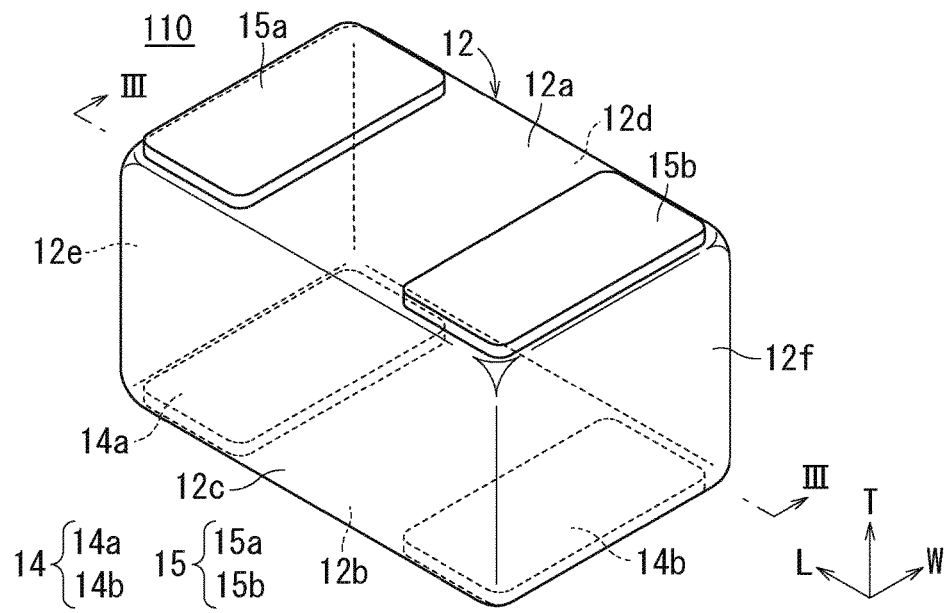
FIG. 7 is a perspective view illustrating a second preferred embodiment of the multilayer ceramic capacitor according to the present invention.
Figure 8:
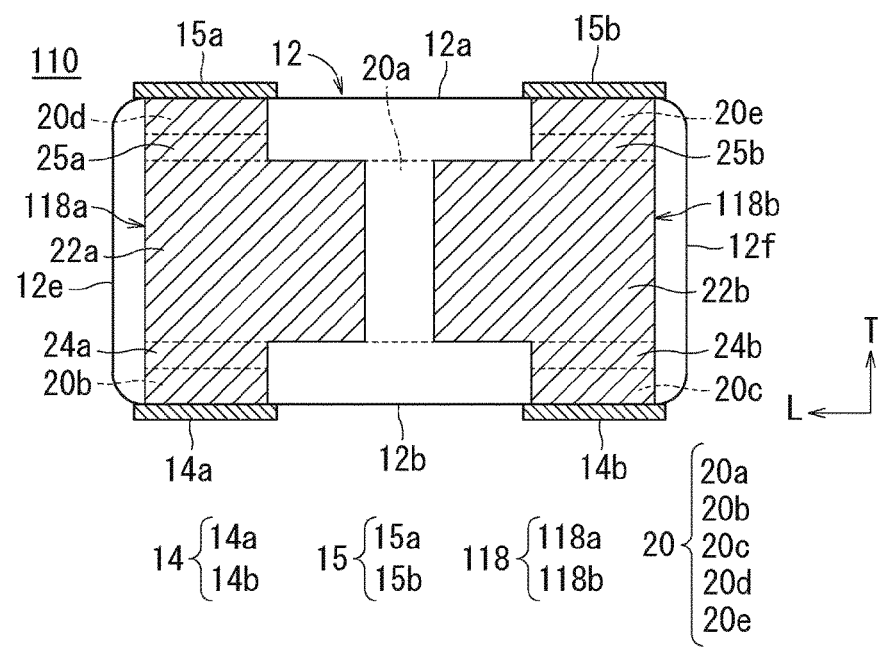
FIG. 8 is a cross-sectional view of the multilayer ceramic capacitor shown in FIG. 7 along the line III-III.
Figure 9:
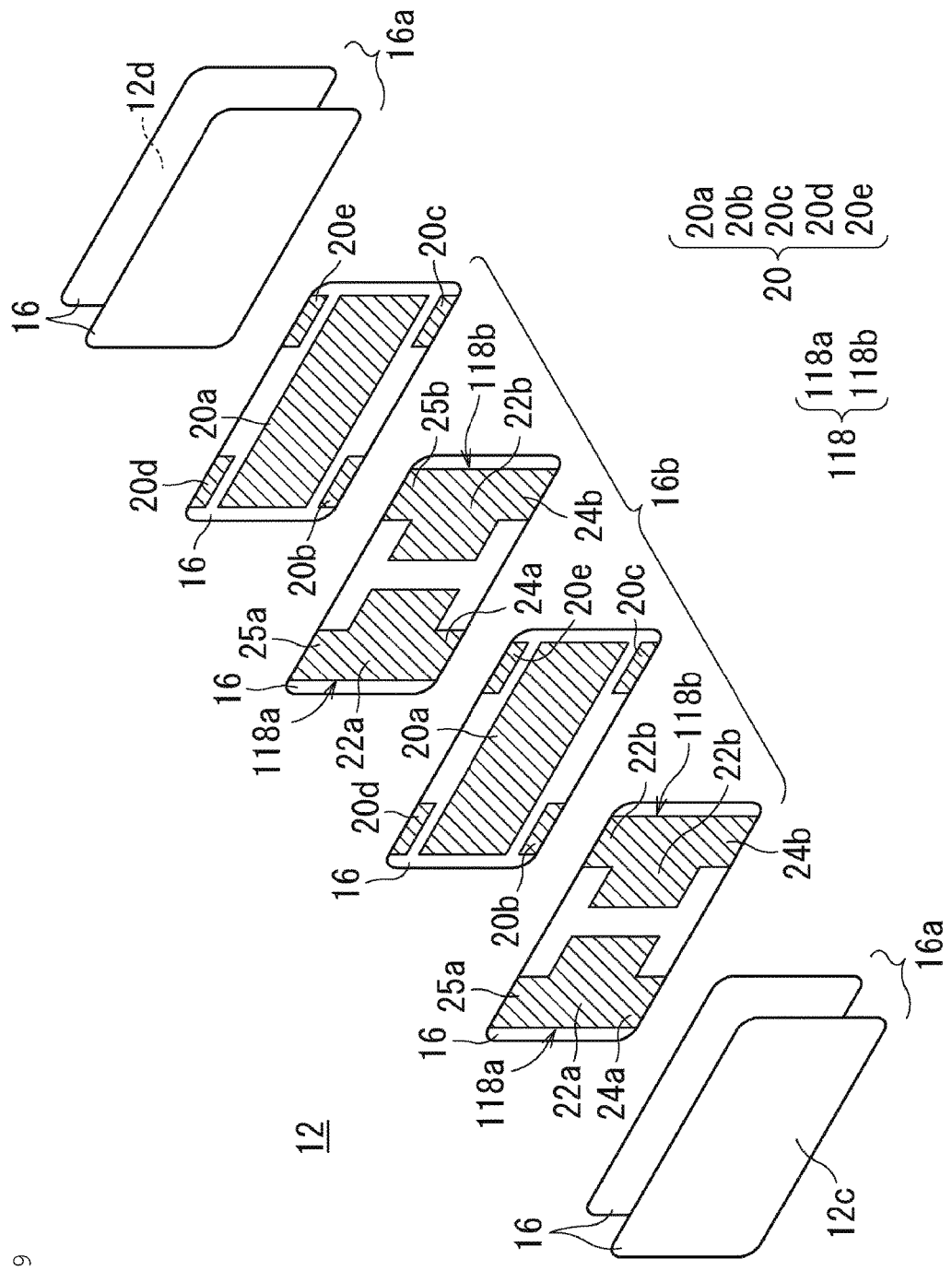
FIG. 9 is an exploded perspective view of the laminated body shown in FIGS. 7 and 8.

Next, a multilayer ceramic capacitor according to a second preferred embodiment of the present invention will be described. FIG. 7 is a perspective view illustrating the second preferred embodiment of the multilayer ceramic capacitor according to the present invention, and FIG. 8 is a cross-sectional view of the multilayer ceramic capacitor shown in FIG. 7 along the line III-III. FIG. 9 is an exploded perspective view of the laminated body shown in FIGS. 7 and 8. It is to be noted that in the multilayer ceramic capacitor 110 shown in FIGS. 7 through 9, the same or similar portions as those of the multilayer ceramic capacitor 10 shown in FIGS. 1 through 3 are denoted by the same symbols, and descriptions of the portions will be omitted.

The difference of the configuration of the multilayer ceramic capacitor 110 shown in FIGS. 7 through 9 from the configuration of the multilayer ceramic capacitor 10 shown in FIGS. 1 through 3 is that external electrodes 15 are further disposed on the first principal surface 12a, because internal electrodes 118 extend to both principal surfaces 12a and 12b. Furthermore, in the multilayer ceramic capacitor 110 shown in FIGS. 7 through 9, auxiliary conductors 20 include fourth auxiliary conductors 20d and fifth auxiliary conductors 20e exposed at the first principal surface 12a.

The multilayer ceramic capacitor 110 includes a laminated body 12 having a cuboid or substantially cuboid shape, and external electrodes 14, 15.

The laminated body 12 includes multiple ceramic layers 16, the multiple internal electrodes 118, and the multiple auxiliary conductors 20.

In the multilayer ceramic capacitor 110, the internal electrodes 118 and the auxiliary conductors 20 are laminated alternately with the ceramic layers 16 interposed therebetween in the laminated body 12, as shown in FIGS. 8 and 9.

The laminated body 12 includes, as the multiple internal electrodes 118, a plurality of first internal electrodes 118a and a plurality of second internal electrodes 118b. The first internal electrodes 118a are disposed on the surfaces of the ceramic layers 16. The first internal electrodes 118a each include a first opposed electrode portion 22a opposed to a first side surface 12c and a second side surface 12d, are laminated in the direction of connecting the first side surface 12c and the second side surface 12d.

In addition, the second internal electrodes 118a are disposed on the surfaces of the same ceramic layers 16 as the ceramic layers 16 on which the first internal electrodes 118a are disposed. The second internal electrodes 118b each include a second opposed electrode portion 22b opposed to a first side surface 12c and a second side surface 12d, are laminated in the direction of connecting the first side surface 12c and the second side surface 12d. The first internal electrodes 118a are disposed closer to the first end surface 12e, and the second internal electrodes 118b are disposed closer to the second end surface 12f. In addition, the first internal electrode 118a and the second internal electrode 118b are arranged spaced away from each other on the surface of the same ceramic layer 16.

The first internal electrodes 118a include first extended electrode portions 24a that extend to the second principal surface 12b of the laminated body 12, and include first extended electrode portions 25a that extend to the first principal surface 12a of the laminated body 12. The first extended electrode portions 24a and 25a extend closer to the first end surface 12e of the laminated body 12. The second internal electrodes 118b include second extended electrode portions 24b that extend to the second principal surface 12b of the laminated body 12, and include second extended electrode portions 25b that extend to the first principal surface 12a of the laminated body 12. The second extended electrode portions 24b are extended closer to the second end surface 12f of the laminated body 12, at intervals from the first extended electrode portions 24a, and the second extended electrode portions 25b are extended closer to the second end surface 12f of the laminated body 12, at intervals from the first extended electrode portions 25a. The first internal electrodes 118a and the second internal electrodes 118b are not exposed at the both side surfaces 12c and 12d and both end surfaces 12e and 12f. Further, the first internal electrodes 118a and the second internal electrodes 118b preferably have a T-shape.

The first internal electrodes 118a and the second internal electrodes 118b are disposed perpendicular or substantially perpendicular to the first principal surface 12a and second principal surface 12b of the laminated body 12. The first opposed electrode portions 22a of the first internal electrodes 118a and the second opposed electrode portions 22b of the second internal electrodes 118b are disposed to be mutually opposed to the auxiliary conductors 20.

The laminated body 12 includes, as the multiple auxiliary conductors 20, a plurality of first auxiliary conductors 20a, a plurality of second auxiliary conductors 20b, a plurality of third auxiliary conductors 20c, the plurality of fourth auxiliary conductors 20d, and the plurality of fifth auxiliary conductors 20e.

The first auxiliary conductors 20a are disposed on surfaces of the ceramic layers 16 which are different from the ceramic layers 16 on which the internal electrodes 18 are disposed, and disposed so as not to be exposed at the surface of the laminated body 12. The shapes of the first auxiliary conductors 20a are not particularly limited, but are preferably rectangular or substantially rectangular.

The second auxiliary conductors 20b are disposed on the surfaces of the same ceramic layers 16 as the ceramic layers 16 on which the first auxiliary conductors 20a are disposed. The second auxiliary conductors 20b are arranged spaced away from the first auxiliary conductors 20a, and disposed so as to be exposed at the second principal surface 12b. In addition, the second auxiliary conductors 20b are disposed closer to the first end surface 12e. The shapes of the second auxiliary conductors 20b are not particularly limited, but are preferably rectangular or substantially rectangular.

The third auxiliary conductors 20c are disposed on the surfaces of the same ceramic layers 16 as the ceramic layers 16 on which the first auxiliary conductors 20a and second auxiliary conductors 20b are disposed. The third auxiliary conductors 20c are arranged spaced away from the first auxiliary conductors 20a and the second auxiliary conductors 20b, and disposed so as to be exposed at the second principal surface 12b. In addition, the third auxiliary conductors 20c are disposed closer to the second end surface 12f. The shapes of the third auxiliary conductors 20c are not particularly limited, but are preferably rectangular or substantially rectangular.

The fourth auxiliary conductors 20d are disposed on the surfaces of the same ceramic layers 16 as the ceramic layers 16 on which the first auxiliary conductors 20a, second auxiliary conductors 20b, and third auxiliary conductors 20c are disposed. The fourth auxiliary conductors 20d are arranged spaced away from the first auxiliary conductors 20a, the second auxiliary conductors 20b, and the third auxiliary conductors 20c, and disposed so as to be exposed at the first principal surface 12a that is a principal surface opposed to the principal surface at which the second auxiliary conductors 20b are exposed. In addition, the fourth auxiliary conductors 20d are disposed closer to the first end surface 12e. The shapes of the fourth auxiliary conductors 20d are not particularly limited, but are preferably rectangular or substantially rectangular.

The fifth auxiliary conductors 20e are disposed on the surfaces of the same ceramic layers 16 as the ceramic layers 16 on which the first auxiliary conductors 20*a*, second auxiliary conductors 20*b*, third auxiliary conductors 20*c*, and fourth auxiliary conductor 20*d* are disposed. The fifth auxiliary conductors 20*e* are arranged spaced away from the first auxiliary conductors 20*a*, the second auxiliary conductors 20*b*, the third auxiliary conductors 20*c*, and the fourth auxiliary conductors 20*d*, and disposed so as to be exposed at the first principal surface 12*a* that is a principal surface opposed to the principal surface at which the third auxiliary conductors 20*c* are exposed. In addition, the fifth auxiliary conductors 20*e* are disposed closer to the second end surface 12*f*. The shapes of the fifth auxiliary conductors 20*e* are not particularly limited, but are preferably rectangular or substantially rectangular.

When the first internal electrodes 118*a* and the second internal electrodes 118*b* have T shapes, and the first auxiliary conductors 20*a*, the second auxiliary conductors 20*b*, the third auxiliary conductors 20*c*, the fourth auxiliary conductors 20*d*, and the fifth auxiliary conductors 20*e* have rectangular or substantially rectangular shapes, the printability of internal electrode patterns and auxiliary conductor patterns is improved in the manufacturing process, to enable easy formation of the first auxiliary conductors 20*a*, the second auxiliary conductors 20*b*, the third auxiliary conductors 20*c*, the fourth auxiliary conductors 20*d*, and the fifth auxiliary conductors 20*e*.

The external electrodes 14 are provided on the second principal surface 12*b* of the laminated body 12, and the external electrodes 15 are provided on the first principal surface 12*a* of the laminated body 12. The external electrodes 14 include a first external electrode 14*a* structured to be electrically connected to the first extended electrode portions 24*a* and the second auxiliary conductors 20*b*; and a second external electrode 14*b* structured to be electrically connected to the second extended electrode portions 24*b* and the third auxiliary conductors 20*c*. In addition, the external electrodes 15 include a third external electrode 15*a* structured to be electrically connected to the first extended electrode portions 25*a* and the fourth auxiliary conductors 20*d*; and a fourth external electrode 15*b* structured to be electrically connected to the second extended electrode portions 25*b* and the fifth auxiliary conductors 20*e*.

The external electrodes 14 and 15 each preferably includes a base electrode layer and a plated layer in order from the side closer to the laminated body 12.

This multilayer ceramic capacitor 110 achieves the same or similar advantageous effect as that of the multilayer ceramic capacitor 10 described above, and also achieves the following advantageous effect.

More specifically, in the example of the multilayer ceramic capacitor 110, the external electrodes 15 are disposed on the first principal surface 12*a* of the laminated body 12, and the external electrodes 14 are disposed on the second principal surface 12*b* thereof, and any of the first principal surface 12*a* and the second principal surface 12*b* may thus be used as a mounting surface. Therefore, the capacitor provides the effect of eliminating the need to select the orientation for mounting. Accordingly, the multilayer ceramic capacitor 110 is able be mounted efficiently onto a circuit board.

Figure 10:
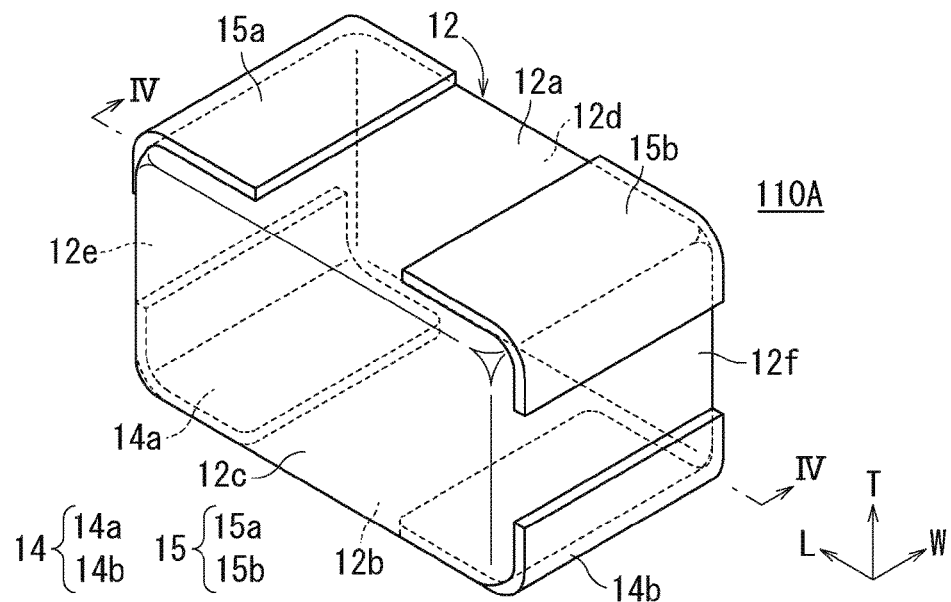
FIG. 10 is a perspective view illustrating a modified example of the second preferred embodiment of the multilayer ceramic capacitor according to the present invention.
Figure 11:
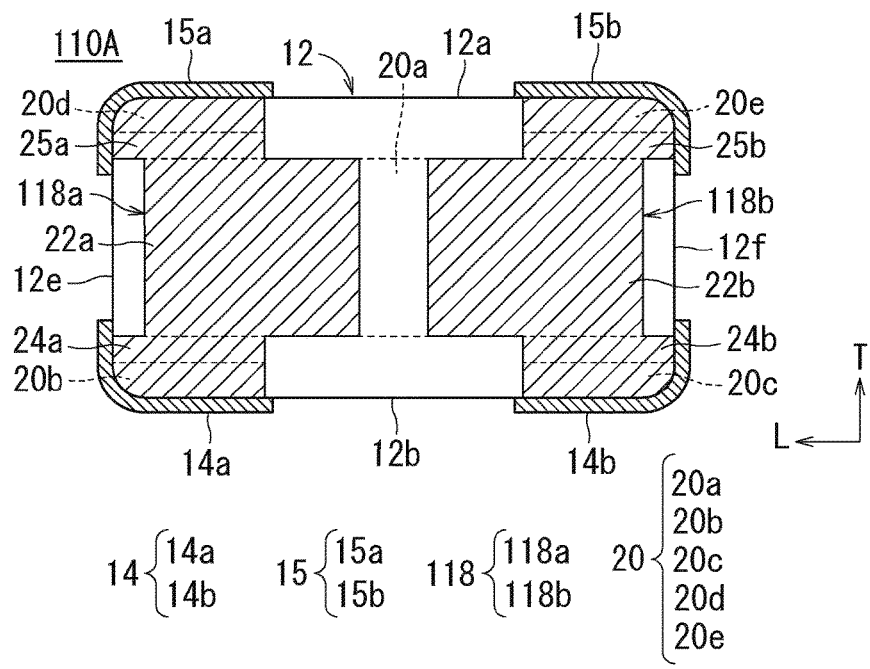
FIG. 11 is a cross-sectional view of the multilayer ceramic capacitor shown in FIG. 10 along the line IV-IV.
Figure 12:
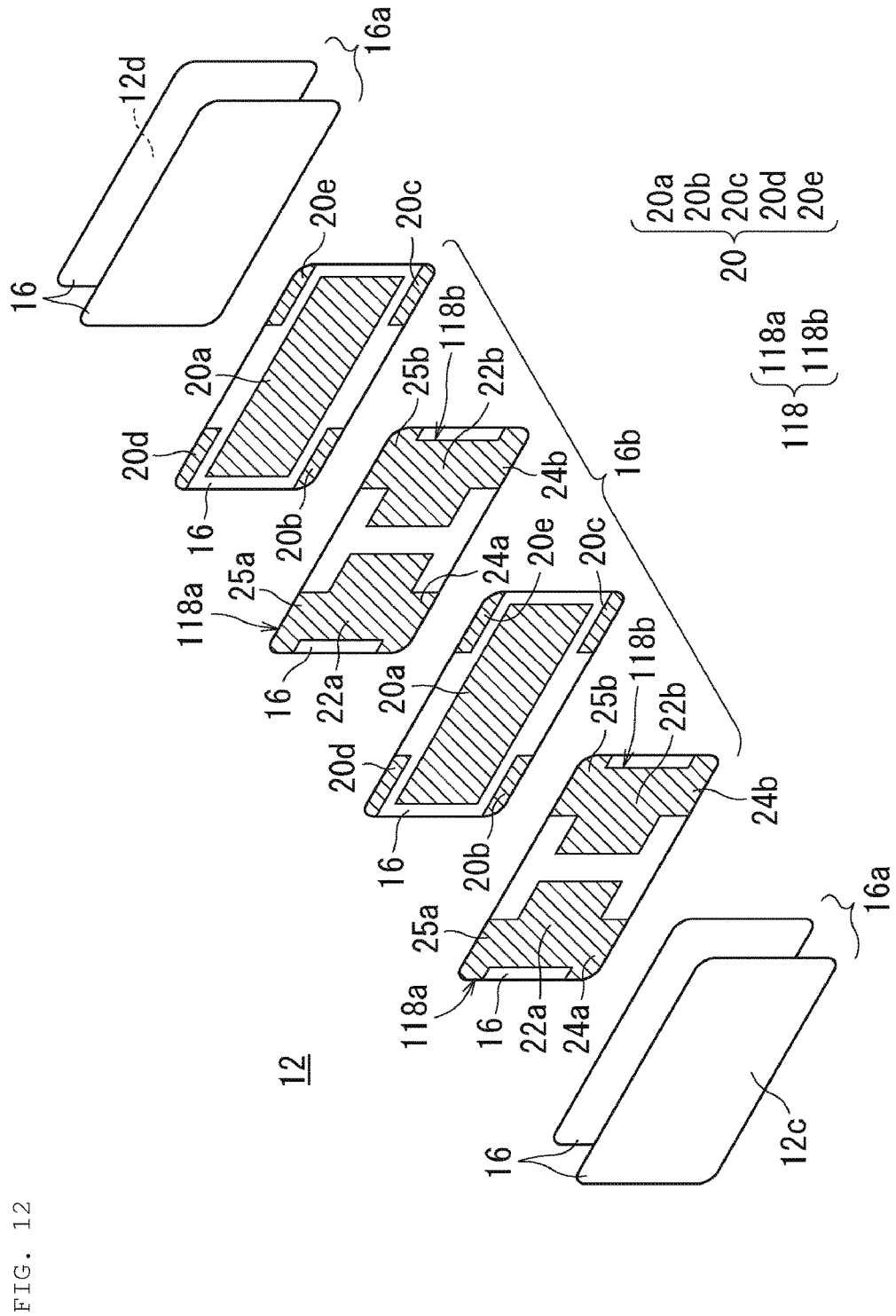
FIG. 12 is an exploded perspective view of the laminated body shown in FIGS. 10 and 11.

Next, a modified example of the multilayer ceramic capacitor according to the second preferred embodiment of the present invention will be described. FIG. 10 is an appearance perspective view illustrating a modified example of the second preferred embodiment of the multilayer ceramic capacitor according to the present invention, and FIG. 11 is a cross-sectional view of the multilayer ceramic capacitor shown in FIG. 10 along the line IV-IV. FIG. 12 is an exploded perspective view of the laminated body shown in FIGS. 10 and 11. It is to be noted that in the multilayer ceramic capacitor 110A shown in FIGS. 10 through 12, the same or similar portions as those of the multilayer ceramic capacitor 10 shown in FIGS. 1 through 3 and the multilayer ceramic capacitor 110 shown in FIGS. 7 through 9 are denoted by the same symbols, and descriptions of the portions will be omitted.

The difference of the configuration of the multilayer ceramic capacitor 110A shown in FIGS. 10 through 12 from the configuration of the multilayer ceramic capacitor 110 shown in FIGS. 7 through 9 is that external electrodes 14 and 15 are also disposed on both end surfaces 12*e* and 12*f* of a laminated body 12 because internal electrodes 118 and auxiliary conductors 20 are also exposed partially at the both end surfaces 12*e* and 12*f*.

The multilayer ceramic capacitor 110A includes the laminated body 12 having a cuboid or substantially cuboid shape, and the external electrodes 14, 15.

The laminated body 12 includes multiple ceramic layers 16, the multiple internal electrodes 118, and the multiple auxiliary conductors 20.

In the multilayer ceramic capacitor 110A, the internal electrodes 118 and the auxiliary conductors 20 are laminated alternately with ceramic layers 16 interposed therebetween in the laminated body 12, as shown in FIGS. 11 and 12.

The laminated body 12 includes, as the multiple internal electrodes 118, a plurality of first internal electrodes 118*a* and a plurality of second internal electrodes 118*b*. The first internal electrodes 118*a* are disposed on the surfaces of the ceramic layers 16. In addition, the first internal electrodes 118*a* each with a first opposed electrode portion 22*a* opposed to a first side surface 12*c* and a second side surface 12*d*, are laminated in the direction of connecting the first side surface 12*c* and the second side surface 12*d*.

In addition, the second internal electrodes 118*a* are disposed on the surfaces of the same ceramic layers 16 as the ceramic layers 16 on which the first internal electrodes 118*a* are disposed. The second internal electrodes 118*b* each including a second opposed electrode portion 22*b* opposed to a first side surface 12*c* and a second side surface 12*d*, are laminated in the direction of connecting the first side surface 12*c* and the second side surface 12*d*. The first internal electrode 118*a* and the second internal electrode 118*b* are arranged spaced away from each other on the surface of the same ceramic layer 16.

The first internal electrodes 118*a* include first extended electrode portions 24*a* that extend to corner regions formed by the second principal surface 12*b* and first end surface 12*e* of the laminated body 12, and include first extended electrode portions 25*a* that extend to corner regions defined by the first principal surface 12*a* and first end surface 12*e* of the laminated body 12. The first extended electrode portions 24*a* and 25*a* are extended closer to the first end surface 12*e*. The second internal electrodes 118*b* include second extended electrode portions 24*b* that extend to corner regions defined by the second principal surface 12*b* and second end surface 12*f* of the laminated body 12, and include second extended electrode portions 25*b* that extend to corner region defined by the first principal surface 12*a* and second end surface 12*f* of the laminated body 12. The second extended electrode portions 24*b* and 25*b* are extended closer to the second end surface 12*f* of the laminated body 12, at intervals from the first extended electrode portions 24*a* and 25*a*. The first internal electrodes 118*a* and the second internal electrodes 118*b* are not disposed at the first principal surface 12*a* and both side surfaces 12c and 12d of the laminated body 12. Further, the first internal electrodes 118a and the second internal electrodes 118b preferably have a T or substantially T shape.

The first internal electrodes 118a and the second internal electrodes 118b are disposed perpendicular or substantially perpendicular to the first principal surface 12a and second principal surface 12b of the laminated body 12. The first opposed electrode portions 22a of the first internal electrodes 118a and the second opposed electrode portions 22b of the second internal electrodes 118b are disposed to be mutually opposed to the auxiliary conductors 20.

The laminated body 12 includes, as the multiple auxiliary conductors 20, a plurality of first auxiliary conductors 20a, a plurality of second auxiliary conductors 20b, a plurality of third auxiliary conductors 20c, the plurality of fourth auxiliary conductors 20d, and the plurality of fifth auxiliary conductors 20e.

The first auxiliary conductors 20a are disposed on surfaces of the ceramic layers 16 which are different from the ceramic layers 16 on which the internal electrodes 18 are disposed, and disposed so as not to be exposed at the surface of the laminated body 12. The shapes of the first auxiliary conductors 20a are not particularly limited, but are preferably rectangular or substantially rectangular.

The second auxiliary conductors 20b are disposed on the surfaces of the same ceramic layers 16 as the ceramic layers 16 on which the first auxiliary conductors 20a are disposed. The second auxiliary conductors 20b are arranged spaced away from the first auxiliary conductors 20a, and disposed so as to be exposed partially at the second principal surface 12b and the first end surface 12e. The second auxiliary conductors 20b extend to corner regions formed by the second principal surface 12b and first end surface 12e of the laminated body 12. In addition, the second auxiliary conductors 20b are disposed closer to the first end surface 12e. The shapes of the second auxiliary conductors 20b are not particularly limited, but are preferably rectangular or substantially rectangular.

The third auxiliary conductors 20c are disposed on the surfaces of the same ceramic layers 16 as the ceramic layers 16 on which the first auxiliary conductors 20a and second auxiliary conductors 20b are disposed. The third auxiliary conductors 20c are arranged spaced away from the first auxiliary conductors 20a and the second auxiliary conductors 20b, and disposed so as to be exposed partially at the second principal surface 12b and the second end surface 12f. The third auxiliary conductors 20c extend to corner regions defined by the second principal surface 12b and second end surface 12f of the laminated body 12. In addition, the third auxiliary conductors 20c are disposed closer to the second end surface 12f. The shapes of the third auxiliary conductors 20c are not particularly limited, but are preferably rectangular or substantially rectangular.

The fourth auxiliary conductors 20d are disposed on the surfaces of the same ceramic layers 16 as the ceramic layers 16 on which the first auxiliary conductors 20a, second auxiliary conductors 20b, and third auxiliary conductors 20c are disposed. The fourth auxiliary conductors 20d are arranged spaced away from the first auxiliary conductors 20a, the second auxiliary conductors 20b, and the third auxiliary conductors 20c, and disposed so as to be exposed partially at the first principal surface 12a that is a surface opposed to the principal surface at which the second auxiliary conductors 20b are exposed, and the first end surface 12e. The fourth auxiliary conductors 20d extend to corner regions defined by the first principal surface 12a and first end surface 12e of the laminated body 12. In addition, the fourth auxiliary conductors 20d are disposed closer to the first end surface 12e. The shapes of the fourth auxiliary conductors 20d are not particularly limited, but preferably rectangular or substantially rectangular.

The fifth auxiliary conductors 20e are disposed on the surfaces of the same ceramic layers 16 as the ceramic layers 16 on which the first auxiliary conductors 20a, second auxiliary conductors 20b, third auxiliary conductors 20c, and fourth auxiliary conductor 20d are disposed. The fifth auxiliary conductors 20e are arranged spaced away from the first auxiliary conductors 20a, the second auxiliary conductors 20b, the third auxiliary conductors 20c, and the fourth auxiliary conductors 20d, and disposed so as to be exposed partially at the first principal surface 12a that is a surface opposed to the principal surface at which the third auxiliary conductors 20c are exposed, and the second end surface 12f. The fifth auxiliary conductors 20e extended corner regions defined by the first principal surface 12a and second end surface 12f of the laminated body 12. In addition, the fifth auxiliary conductors 20e are disposed closer to the second end surface 12f. The shapes of the fifth auxiliary conductors 20e are not particularly limited, but are preferably rectangular or substantially rectangular.

The external electrodes 14 are provided on the second principal surface 12b of the laminated body 12, and the external electrodes 15 are provided on the first principal surface 12a of the laminated body 12. The external electrodes 14 include a first external electrode 14a and a second external electrode 14b. The first external electrode 14a is electrically connected to the first extended electrode portions 24a of the first internal electrodes 118a and the second auxiliary conductors 20b which extend to the second principal surface 12b and the first end surface 12e. Therefore, the first external electrode 14a is disposed to extend to the second principal surface 12b to the first end surface 12e. In addition, the second external electrode 14b is electrically connected to the second extended electrode portions 24b of the second internal electrodes 118b and the third auxiliary conductors 20c which extend to the second principal surface 12b and the second end surface 12f. Therefore, the second external electrode 14b is disposed to extend to the second principal surface 12b to the second end surface 12f.

The external electrodes 15 include a third external electrode 15a and a fourth external electrode 15b. The third external electrode 15a is electrically connected to the first extended electrode portions 25a of the first internal electrodes 118a and the fourth auxiliary conductors 20d which extend to the first principal surface 12a and the first end surface 12e. Therefore, the third external electrode 15a is disposed to extend to the first principal surface 12a to the first end surface 12e. In addition, the fourth external electrode 15b is electrically connected to the second extended electrode portions 25b of the second internal electrodes 118b and the fifth auxiliary conductors 20e which extend to the first principal surface 12a and the second end surface 12f. Therefore, the fourth external electrode 15b is disposed to extend to the first principal surface 12a to the second end surface 12f.

The external electrodes 14 and 15 each preferably include a base electrode layer and a plated layer in order from the side closer to the laminated body 12.

This multilayer ceramic capacitor 110A achieves the same or similar advantageous effect as that of the multilayer ceramic capacitor 110 described above, and also achieves the following advantageous effect.

More specifically, in the example of the multilayer ceramic capacitor 110A, the first external electrode 14a is disposed to extend to the second principal surface 12b to the first end surface 12e, and the third external electrode 15a is disposed to extend to the first principal surface 12a to the first end surface 12e, and the second external electrode 14b is disposed to extend to the second principal surface 12b to the second end surface 12f, and the fourth external electrode 15b is disposed to extend to the first principal surface 12a to the second end surface 12f, and the electrode portions are thus provided on the end surfaces other than the mounting surface. Therefore, the capacitor is able to not only fulfill a fail-safe function, and additionally achieve the effect of eliminating the need to select the orientation for mounting, but also prevent the multilayer ceramic capacitor 110A from inclining during mounting, and further improve the fixing strength to a mounting board, due to the increased joint surfaces of the multilayer ceramic capacitor 110A.

2. Method for Manufacturing Multilayer Ceramic Capacitor

Next, a non-limiting example of a method for manufacturing the multilayer ceramic capacitor will be described. A method for manufacturing multilayer the ceramic capacitor 10 will be primarily described below.

First, ceramic green sheets and a conductive paste for internal electrodes are prepared. The ceramic green sheets and the conductive paste for internal electrodes include a binder (for example, a known organic binder) and a solvent (for example, an organic solvent).

Next, on the ceramic green sheets, the conductive paste is applied in predetermined patterns, for example, by screen printing, for example, to forming conductive paste layers. Specifically, the paste composed of a conductive material is applied onto the ceramic green sheets by a method, such as a screen printing method or a photolithography method, to form conductive paste layers. The paste composed of the conductive material is, for example, a metal powder with an organic binder and an organic solvent added thereto. In addition, ceramic green sheets for outer layers are also prepared which include no internal electrode pattern printed.

Figure 13:
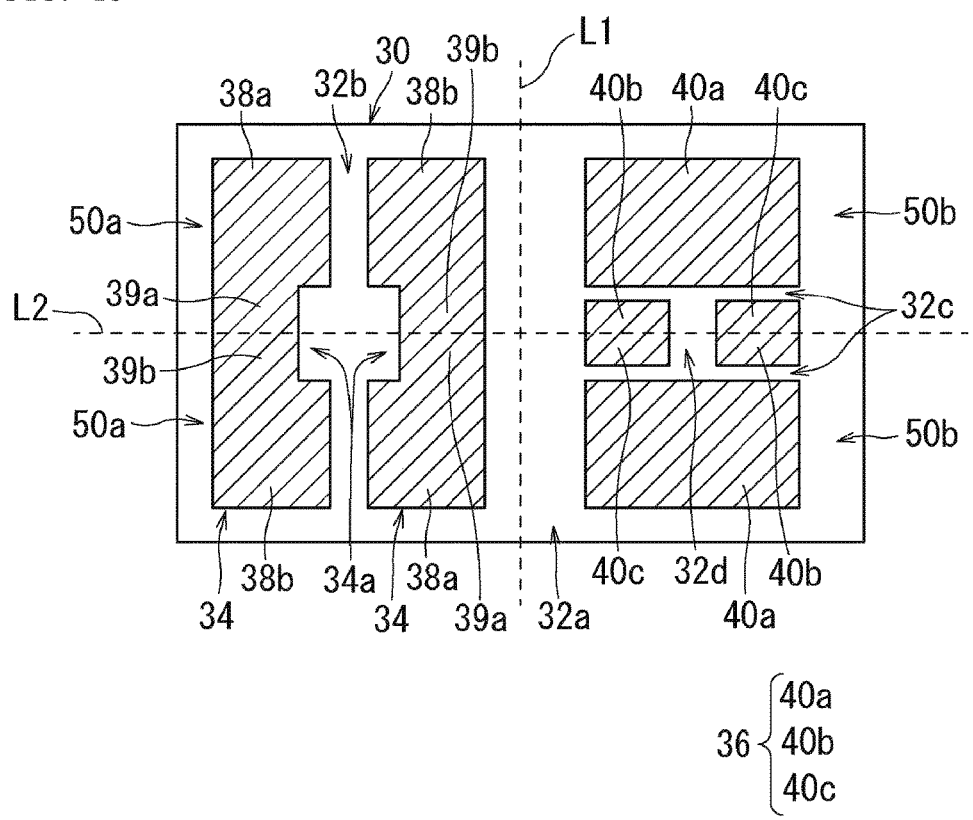
FIG. 13 is a plan view illustrating a ceramic green sheet with conductive paste layers formed for manufacturing the multilayer ceramic capacitor shown in FIGS. 1 through 3.

For example, as shown in FIG. 13, on a ceramic green sheet 30, internal electrode patterns 34 and an auxiliary conductor pattern 36 are provided as the conductive paste layers. It is to be noted that the ceramic green sheet 30 shown in FIG. 13 is one of the ceramic green sheets. In FIG. 13, a vertical cut site L1 and a horizontal cut site L2 are indicated by dotted lines after laminating the ceramic green sheets. The ceramic green sheet 30 includes the internal electrode patterns 34 and 34 disposed in one region, and includes the auxiliary conductor pattern 36 disposed in the other region, with a space 32a provided from the internal electrode pattern 34.

The internal electrode patterns 34 and 34 disposed at one side of the ceramic green sheet 30 are each formed to have a recess shape. The internal electrode patterns 34 and 34 are disposed with a space 32b interposed therebetween such that recess portions 34a of the respective internal electrode patterns 34 are opposed to each other.

In addition, the auxiliary conductor pattern 36 is disposed in the other region of the ceramic green sheet 30. The auxiliary conductor pattern 36 includes first auxiliary conductor patterns 40a, second auxiliary conductor patterns 40b, and third auxiliary conductor patterns 40c. In the other region of the ceramic green sheet 30, the first auxiliary conductor patterns 40a and 40a are disposed with a space 32c interposed therebetween. In the space 32c, the second auxiliary conductor patterns 40b connected and the third auxiliary conductor patterns 40c connected are disposed with a space 32d interposed therebetween.

The vertical cut site L1 is set in a vertical direction, so as to pass through a substantially central portion between the internal electrode pattern 40 and the auxiliary conductor pattern 36 in the ceramic green sheet 30. Then, the cutting along the vertical cut site L1 separates the internal electrode patterns 34 from the auxiliary conductor pattern 36.

In addition, the vertical cut site L2 is set in a vertical direction, so as to pass through substantially central portions of the recess portions 34a of the internal electrode patterns 34 at one side of the ceramic green sheet 30. The cutting along the vertical cut site L2 forms, from the internal electrode patterns 34, first regions 50a that each include a first internal electrode pattern 38a formed to define the first internal electrode 18a and a second internal electrode pattern 38b formed to define the second internal electrode 18b. In the first regions 50a, at the vertical cut site L2, first extended electrode portion patterns 39a are extended to define the first extended electrode portions 24a of the first internal electrodes 18a, and likewise, second extended electrode portion patterns 39b are extended to define the second extended electrode portions 24b of the second internal electrodes 18b.

Furthermore, the vertical cut site L2 is set in a horizontal direction through a substantially central portion of the space 32c at the other side of the ceramic green sheet 30. The cutting along the vertical cut site L2 separates the second auxiliary conductor patterns 40b from each other, and the third auxiliary conductor patterns 40c from each other, thereby forming second regions 50b that each include the first auxiliary conductor pattern 40a formed to define the first auxiliary conductor 20a, the second auxiliary conductor pattern 40b formed to define the second auxiliary conductor 20b, and the third auxiliary conductor pattern 40c formed to define the third auxiliary conductor 20c. In the second regions 50b, the second auxiliary conductor patterns 40b and the third auxiliary conductor patterns 40c are extended at the vertical cut site L2.

Then, the ceramic green sheet 30 with the internal electrode pattern layers 34 and auxiliary conductor pattern layer 36 formed thereon is used to prepare a stacked sheet. More specifically, the ceramic green sheets 30 without any conductive paste layer formed thereon are stacked, the ceramic green sheets 30 with the internal electrode pattern layers 34 and auxiliary conductor pattern layer 36 formed thereon are stacked thereon, and the ceramic green sheets 30 without any conductive paste layer formed thereon are further stacked, thereby preparing a stacked sheet. In this regard, the ceramic green sheets 30 are stacked so that the first region 50a includes an overlap with the second region 50b. This stacked body is subjected to pressing in the stacking direction by a method such as isostatic press, thereby making it possible to provide a mother laminated body.

Furthermore, the stacked sheet is subjected to pressing in the stacking direction by, for example, isostatic pressing, thereby preparing a laminated block.

Subsequently, the laminated block is cut into a predetermined size, thereby preparing a laminated chip. In this regard, the laminated chip may include corners and ridges that are rounded by barrel polishing or the like.

Next, a laminated body is prepared by firing the laminated chip. The firing temperature is preferably about 900° C. or higher and about 1300° C. or lower, for example, depending on the materials of the ceramic and internal electrodes.

In this regard, the first extended electrode portions 24a of the first internal electrodes 18a are exposed from the second principal surface 12b of the laminated body 12. Further, the base electrode layer of the first external electrode 14a is formed to cover the first extended electrode portions 24a of the first internal electrodes 18a exposed from the second principal surface 12b of the laminated body 12. In addition, the second extended electrode portions 24a of the second internal electrodes 18b are exposed from the second principal surface 12b of the laminated body 12. Further, the base electrode layer of the second external electrode 14b is formed to cover the second extended electrode portions 24b of the second internal electrodes 18b exposed from the second principal surface 12b of the laminated body 12.

In order to form the base electrode layer of the first external electrode 14a, for example, a conductive paste for external electrodes is applied to the exposed portions of the first extended electrode portions 24a of the first internal electrodes 18a exposed from the second principal surface 12b of the laminated body 12, and baked. In addition, in order to form the base electrode layer of the second external electrode 14b, for example, a conductive paste for external electrodes is applied to the exposed portions of the second extended electrode portions 24b of the second internal electrodes 18b exposed from the second principal surface 12b of the laminated body 12, and baked. In this regard, the baking temperature is preferably about 700° C. or higher and about 900° C. or lower, for example. Further, if necessary, one or more plated films are formed on the surfaces of the base electrode layers, thereby forming the external electrodes 14.

Alternatively, in order to form the base electrode layer of the first external electrode 14a, for example, the exposed portions of the first extended electrode portions 24a of the first internal electrodes 18a exposed from the second principal surface 12b of the laminated body 12 may be subjected to plating treatment. In addition, in order to form the base electrode layer of the second external electrode 14b, for example, the exposed portions of the second extended electrode portions 24b of the second internal electrodes 18b exposed from the second principal surface 12b of the laminated body 12 may be subjected to plating treatment. While any of electrolytic plating and electroless plating may be adopted for the plating treatment, the electroless plating has the disadvantage of requiring pretreatment with a catalyst or the like in order to improve the plating deposition rate, which makes the process complicated. Therefore, typically, it is preferable to use electrolytic plating. It is preferable to use a barrel plating method as a method for the plating.

It is to be noted that in the example of forming a surface conductor, a surface conductor pattern may be applied by printing in advance onto the surface of the ceramic green sheet as an outermost layer, and subjected to co-firing with the laminated body, or a surface conductor may be applied by printing onto the principal surface of the fired laminated body, and then subjected to baking. In addition, if necessary, one or more plated films may preferably be formed on the surfaces of the base electrode layers, thereby forming the external electrodes 14.

In the manner described above, the multilayer ceramic capacitor 10 shown in FIG. 1 is manufactured.

Advantageous effects of the multilayer ceramic capacitor obtained as described above will be also evident from the following experimental example.

3. Experimental Example

An experimental example will be described below which was provided by the inventors to confirm the advantageous effects of the invention.

Figure 14:
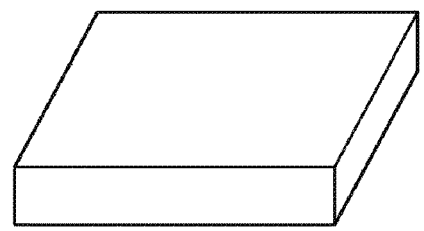
FIG. 14 is an exploded perspective view illustrating an example of a conventional multilayer ceramic capacitor.
Figure 14:
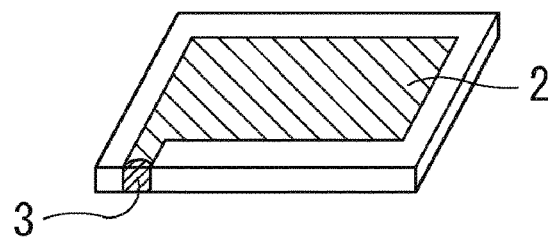
Figure 14:
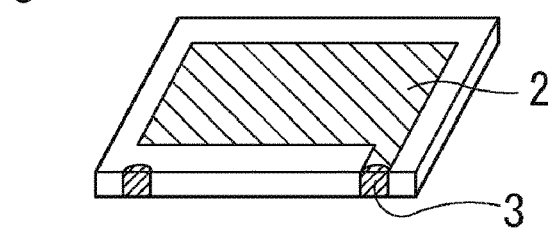
Figure 14:
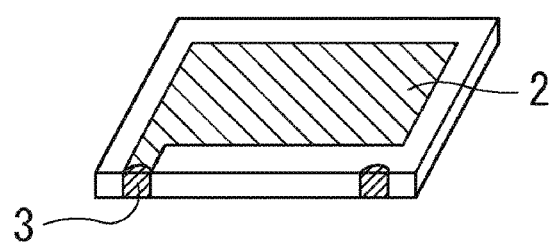
Figure 14:
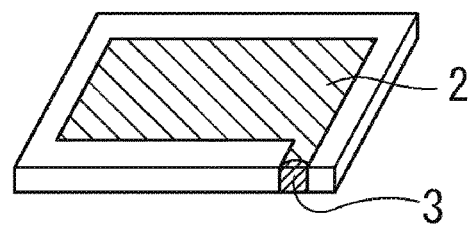
Figure 14:
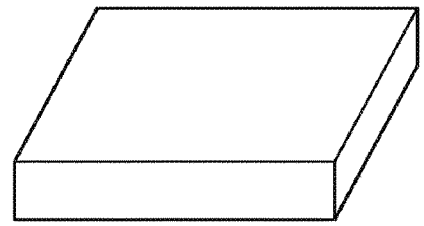

In the experimental example, each sample was prepared while a multilayer ceramic capacitor according to the first preferred embodiment as shown in FIG. 1 through 3 was regarded as an example, whereas a conventional multilayer ceramic capacitor in an aspect as illustrated in FIG. 14 was regarded as a comparative example, and for each sample of multilayer ceramic capacitors according to the example and comparative example, experiments to confirm whether or not the sample was cracked and whether or not the sample was short-circuited were made under predetermined conditions.

The multilayer ceramic capacitor as the sample according to the example, prepared for the experiment, includes specifications as follows. It is to be noted that patterns for internal electrodes and auxiliary conductors of the multilayer ceramic capacitor according to the example were made in the same or similar manner as in the multilayer ceramic capacitor according to the first preferred embodiment as shown in FIGS. 1 through 3. In addition, dimensions, such as a size, have designed values.

Size: $L \times W \times T$=3.2 mm×1.6 mm×1.6 mm

Material of ceramic layers: $BaTiO_3$
Material of internal electrodes: Ni
Material of auxiliary conductors: Ni
Structure of external electrode:
Baked layer: Applying and baking a paste containing a metal powder (Cu) and glass
Plated layer: Two-layer structure of Ni plated layer and Sn plated layer In addition, the multilayer ceramic capacitor as the sample according to the comparative example, prepared for the experiment, includes specifications as follows. It is to be noted that patterns for internal electrodes of the multilayer ceramic capacitor according to the comparative example were made in the same or similar manner as with the multilayer ceramic capacitor shown in FIG. 14. In addition, dimensions, such as a size, have designed values.

Size: $L \times W \times T$=3.2 mm×1.6 mm×1.6 mm

Material of ceramic layers: $BaTiO_3$
Material of internal electrodes: Ni
Structure of external electrode:
Baked layer: Applying and baking a paste containing a metal powder (Cu) and glass
Plated layer: Two-layer structure of Ni plated layer and Sn plated layer Condition 1: After Mounting onto a Board For each of the samples according to the example and the comparative example, whether or not the sample was cracked and whether or not the sample was short-circuited were confirmed under the following four conditions. For each condition, twenty samples were prepared for each of the example and comparative example, in order to confirm whether or not the respective samples were cracked and whether or not the samples were short-circuited. The confirmatory results for each condition are shown below.

Reflow mounting was performed onto a JEITA land board with the use of a LF solder. Thereafter, each sample was removed from the board, a side surface of the sample was polished to the center in the width direction, and it was confirmed whether or not there was any crack with an edge end of the fired electrode layer as a starting point at the polished surface.

In addition, each sample was mounted onto a glass-epoxy board with the use of an LF solder. Thereafter, a humidity load acceleration test for 144 hours was performed by applying a rated voltage to each sample in a high-temperature and high-humidity tank at 125° C., relative humidity of 95% RH, and 1.2 atmospheres. The sample with an insulation resistance value (IR value) decreased by two or more orders of magnitude was determined to a short-circuited sample.

Table 1 shows the results of confirming the number of cracks generated and the number of short circuits generated for each of the example and comparative example under Condition 1.

TABLE 1

|  | The Number of Cracks Generated | The Number of Short Circuits Generated |
|---|---|---|
| Example | 0/20 | 0/20 |
| Comparative Example | 1/20 | 0/20 |

According to Table 1, it has been confirmed that one sample is cracked in the comparative example, while as for the number of short circuits generated, no short circuit is caused in either the example or the comparative example.

Condition 2: Deflection Test after Mounting onto a Board

Reflow mounting was performed onto a JEITA land board with the use of a LF solder, and the wiring board was allowed to undergo a deflection for 5 seconds with a certain amount of deflection (about 5 mm). Thereafter, the sample was removed from the board, a side surface of the sample was polished to the center or approximate center in the width direction, and it was confirmed whether or not there was any crack with an edge end of the fired electrode layer as a starting point at the polished surface.

In addition, each sample was mounted onto a glass-epoxy board with the use of an LF solder. After the wiring board was allowed to undergo a deflection for 5 seconds with the certain amount of deflection (about 5 mm), a humidity load acceleration test for 144 hours was performed by applying a rated voltage to each sample in a high-temperature and high-humidity tank at about 125° C., relative humidity of about 95% RH, and about 1.2 atmospheres. The sample with an insulation resistance value (IR value) decreased by two or more orders of magnitude was determined to a short-circuited sample.

Table 2 shows the results of confirming the number of cracks generated and the number of short circuits generated for each of the example and comparative example under the condition 2.

TABLE 2

|  | The Number of Cracks Generated | The Number of Short Circuits Generated |
|---|---|---|
| Example | 17/20 | 0/20 |
| Comparative Example | 18/20 | 12/20 |

According to Table 2, in the example, seventeen samples were cracked, but no short-circuited sample was confirmed.

On the other hand, in the comparative example, it has been confirmed that eighteen samples are cracked, whereas twelve samples are short-circuited.

Condition 3: Reflow Multiple Times after Mounting onto a Board

Reflow mounting was performed onto a JEITA land board with the use of a LF solder, and under the same or similar condition, reflow was performed five times. Thereafter, the sample was removed from the board, a side surface of the sample was polished to the center in the width direction, and it was confirmed whether or not there was any crack with an edge end of the fired electrode layer as a starting point at the polished surface.

In addition, each sample was mounted by reflow onto a glass-epoxy board with the use of an LF solder. After reflow was performed five times under the same condition, a humidity load acceleration test for 144 hours was performed by applying a rated voltage to each sample in a high-temperature and high-humidity tank at about 125° C., relative humidity of about 95% RH, and about 1.2 atmospheres. The sample with an insulation resistance value (IR value) decreased by two or more orders of magnitude was determined to a short-circuited sample.

Table 3 shows the results of confirming the number of cracks generated and the number of short circuits generated for each of the example and comparative example under the condition 3.

TABLE 3

|  | The Number of Cracks Generated | The Number of Short Circuits Generated |
|---|---|---|
| Example | 3/20 | 0/20 |
| Comparative Example | 3/20 | 1/20 |

According to Table 3, in the example, three samples were cracked, but no short-circuited sample was confirmed.

On the other hand, in the comparative example, it has been confirmed that three samples are cracked, whereas one sample is short-circuited.

Condition 4: Temperature Cycle Test after Mounting onto a Board

Reflow mounting was performed onto a JEITA land board with the use of a LF solder, and the cycle of maintaining each of the minimum and maximum operating temperatures for 30 minutes for each temperature was repeated 2000 times. Thereafter, the sample was removed from the board, a side surface of the sample was polished to the center or approximate center in the width direction, and it was confirmed whether or not there was any crack with an edge end of the fired electrode layer as a starting point at the polished surface.

In addition, each sample was mounted onto a glass-epoxy board with the use of an LF solder. Then, after the cycle of maintaining each of the minimum and maximum operating temperatures for 30 minutes for each temperature was repeated 2000 times, a humidity load acceleration test for 144 hours was performed by applying a rated voltage to each sample in a high-temperature and high-humidity tank at about 125° C., relative humidity of about 95% RH, and about 1.2 atmospheres. The sample with an insulation resistance value (IR value) decreased by two or more orders of magnitude was determined to a short-circuited sample.

Table 4 shows the results of confirming the number of cracks generated and the number of short circuits generated for each of the example and comparative example under the conduction 4.

TABLE 4

|  | The Number of Cracks Generated | The Number of Short Circuits Generated |
|---|---|---|
| Example | 8/20 | 0/20 |
| Comparative Example | 10/20 | 3/20 |

According to Table 4, in the example, eight samples were cracked, but no short-circuited sample was confirmed.

On the other hand, in the comparative example, it has been confirmed that ten samples are cracked, whereas three samples are short-circuited.

From the foregoing results, it has been confirmed that the samples according to the example are able to prevent the multilayer ceramic capacitors from being short-circuited even when the multilayer ceramic capacitors are cracked, because the samples are provided with a fail-safe function.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminated body that includes a plurality of ceramic layers laminated, first and second principal surfaces which are opposed to each other, first and second side surfaces which are opposed to each other in a laminating direction, and first and second end surfaces which are opposed to each other in a length direction of the laminated body, with one of the first and second principal surfaces defining a mounting surface;
   a first internal electrode disposed on a surface of one of the plurality of ceramic layers in the laminated body, and partially exposed at one of the first and second principal surfaces;
   a second internal electrode disposed on the surface of one of the plurality of ceramic layers on which the first internal electrode is disposed, arranged spaced away from the first internal electrode, and partially exposed at one of the first and second principal surfaces;
   a first auxiliary conductor disposed in the laminated body, disposed on a surface of a different one of the plurality of ceramic layers from the one of the plurality of ceramic layers on which the first and second internal electrodes are disposed, and unexposed at any of the surfaces of the laminated body;
   a second auxiliary conductor disposed on the surface of the different one of the plurality of ceramic layers on which the first auxiliary conductor is disposed, arranged spaced away from the first auxiliary conductor, and exposed at one of the first and second principal surfaces;
   a third auxiliary conductor disposed on the surface of the different one of the plurality of ceramic layers on which the first and second auxiliary conductors are disposed, arranged spaced away from the first and second auxiliary conductors, and exposed at one of the first and second principal surfaces;
   a first external electrode connected to the first internal electrode and the second auxiliary conductor, and disposed on the first or second principal surface; and
   a second external electrode connected to the second internal electrode and the third auxiliary conductor, and disposed on the first or second principal surface;
   wherein the second and third auxiliary conductors overlap the first auxiliary conductor in a thickness direction, and the thickness direction in perpendicular or substantially perpendicular to the laminating direction and the length direction.

2. The multilayer ceramic capacitor according to claim 1, wherein
   the first internal electrode is further exposed partially at the first end surface;
   the second internal electrode is further exposed partially at the second end surface;
   the second auxiliary conductor is further exposed partially at the first end surface;
   the third auxiliary conductor is further exposed partially at the second end surface;
   the first external electrode is connected to the first internal electrode and the second auxiliary conductor, and disposed partially on the first or second principal surface to the first end surface; and
   the second external electrode is connected to the second internal electrode and the third auxiliary conductor, and disposed partially on the first or second principal surface to the second end surface.

3. The multilayer ceramic capacitor according to claim 1, wherein
   the first and second internal electrodes have an L or substantially L shape; and
   the first auxiliary conductor, the second auxiliary conductor, and the third auxiliary conductor have a rectangular or substantially rectangular shape.

4. The multilayer ceramic capacitor according to claim 2, wherein
   the first and second internal electrodes have an L or substantially L shape; and
   the first auxiliary conductor, the second auxiliary conductor, and the third auxiliary conductor have a rectangular or substantially rectangular shape.

5. The multilayer ceramic capacitor according to claim 1, wherein the first internal electrode is not connected to the second internal electrode.

6. The multilayer ceramic capacitor according to claim 1, wherein
   the first internal electrode includes a first opposed electrode portion that opposes the first auxiliary conductor;
   the first internal electrode includes a first extended electrode portion that opposes the second auxiliary conductor;
   the second internal electrode includes a second opposed electrode portion that opposes the first auxiliary conductor; and
   the second internal electrode includes a second extended electrode portion that opposes the third auxiliary conductor.

7. The multilayer ceramic capacitor according to claim 1, wherein the each of the first and second external electrodes includes a base electrode layer and a plated layer in order from a side closer to the laminated body.

8. The multilayer ceramic capacitor according to claim 7, wherein the base electrode layer includes at least one layer selected from a baked layer, a resin layer, or a thin film layer.

9. The multilayer ceramic capacitor according to claim 7, wherein the base electrode layer is a baked layer including glass and a metal.

10. The multilayer ceramic capacitor according to claim 7, wherein the plated layer includes multiple plated layers.

11. A multilayer ceramic capacitor comprising:
a laminated body that includes a plurality of ceramic layers laminated, first and second principal surfaces which are opposed to each other, first and second side surfaces which are opposed to each other in a laminating direction, and first and second end surfaces which are opposed to each other, with one of the first or second principal surfaces defining a mounting surface;
a first internal electrode disposed on a surface of one of the plurality of ceramic layers in the laminated body, and partially exposed at the first and second principal surfaces;
a second internal electrode disposed on the surface of the one of the plurality of ceramic layers on which the first internal electrode is disposed, arranged spaced away from the first internal electrode, and partially extended at the first and second principal surfaces;
a first auxiliary conductor disposed in the laminated body, disposed on a surface of a different one of the plurality of ceramic layers from the one of the plurality of ceramic layers on which the first and second internal electrodes are disposed, and unexposed at any of the surfaces of the laminated body;
a second auxiliary conductor disposed on the surface of the different one of the plurality of ceramic layers on which the first auxiliary conductor is disposed, arranged spaced away from the first auxiliary conductor, and exposed at any one of the first and second principal surfaces;
a third auxiliary conductor disposed on the surface of the different one of the plurality of ceramic layers on which the first and second auxiliary conductors are disposed, arranged spaced away from the first and second auxiliary conductors, and exposed at any one of the first and second principal surfaces;
a fourth auxiliary conductor disposed on the surface of the different one of the plurality of ceramic layers on which the first, second, and third auxiliary conductors are disposed, arranged spaced away from the first, second, and third auxiliary conductors, and exposed at the principal surface opposed to the surface with the second auxiliary conductor disposed;
a fifth auxiliary conductor disposed on the surface of the different one of the plurality of ceramic layers on which the first, second, third, and fourth auxiliary conductors are disposed, arranged spaced away from the first, second, third, and fourth auxiliary conductors, and exposed at the principal surface opposed to the surface with the third auxiliary conductor disposed;
a first external electrode disposed on the second principal surface and connected to the first internal electrode and the second auxiliary conductor;
a second external electrode disposed on the second principal surface and connected to the second internal electrode and the third auxiliary conductor;
a third external electrode disposed on the first principal surface and connected to the first internal electrode and the fourth auxiliary conductor; and
a fourth external electrode disposed on the first principal surface and connected to the second internal electrode and the fifth auxiliary conductor.

12. The multilayer ceramic capacitor according to claim 11, wherein
the first internal electrode is further exposed partially at the first end surface;
the second internal electrode is further exposed partially at the second end surface;
the second auxiliary conductor and the fourth auxiliary conductor are further exposed partially at the first end surface;
the third auxiliary conductor and the fifth auxiliary conductor are further exposed partially at the second end surface;
the first external electrode is connected to the first internal electrode and the second auxiliary conductor, and disposed partially on the second principal surface to the first end surface;
the second external electrode is connected to the second internal electrode and the third auxiliary conductor, and disposed partially on the second principal surface to the second end surface;
the third external electrode is connected to the first internal electrode and the fourth auxiliary conductor, and disposed partially on the first principal surface to the first end surface; and
the fourth external electrode is connected to the second internal electrode and the fifth auxiliary conductor, and disposed partially on the first principal surface to the second end surface.

13. The multilayer ceramic capacitor according to claim 11, wherein
the first and second internal electrodes have a T or substantially T shape; and
the first auxiliary conductor, the second auxiliary conductor, the third auxiliary conductor, the fourth auxiliary conductor, and the fifth auxiliary conductor have a rectangular or substantially rectangular shape.

14. The multilayer ceramic capacitor according to claim 12, wherein
the first and second internal electrodes have a T or substantially T shape; and
the first auxiliary conductor, the second auxiliary conductor, the third auxiliary conductor, the fourth auxiliary conductor, and the fifth auxiliary conductor have a rectangular or substantially rectangular shape.

15. The multilayer ceramic capacitor according to claim 11, wherein the first internal electrode is not connected to the second internal electrode.

16. The multilayer ceramic capacitor according to claim 11, wherein
the first internal electrode includes a first opposed electrode portion that opposes the first auxiliary conductor;
the first internal electrode includes first extended electrode portions that oppose the second auxiliary conductor and the fourth auxiliary conductor;
the second internal electrode includes a second opposed electrode portion that opposes the first auxiliary conductor; and
the second internal electrode includes second extended electrode portions that oppose the third auxiliary conductor and the fifth auxiliary conductor.

17. The multilayer ceramic capacitor according to claim 11, wherein the each of the first, second, third, and fourth external electrodes includes a base electrode layer and a plated layer in order from a side closer to the laminated body.

18. The multilayer ceramic capacitor according to claim 17, wherein the base electrode layer includes at least one layer selected from a baked layer, a resin layer, or a thin film layer.

19. The multilayer ceramic capacitor according to claim 17, wherein the base electrode layer is a baked layer including glass and a metal.

20. The multilayer ceramic capacitor according to claim 17, wherein the plated layer includes multiple plated layers.

* * * * *